United States Patent
Bok et al.

(10) Patent No.: US 12,422,949 B2
(45) Date of Patent: Sep. 23, 2025

(54) ELECTRONIC DEVICE

(71) Applicant: SAMSUNG DISPLAY CO., LTD., Yongin-si (KR)

(72) Inventors: Seung-Lyong Bok, Yongin-si (KR); Kicheol Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/434,183

(22) Filed: Feb. 6, 2024

(65) Prior Publication Data
US 2024/0310948 A1   Sep. 19, 2024

(30) Foreign Application Priority Data
Mar. 14, 2023   (KR) ................. 10-2023-0033188

(51) Int. Cl.
*G06F 3/041*   (2006.01)
*G06F 3/044*   (2006.01)

(52) U.S. Cl.
CPC ........ *G06F 3/04166* (2019.05); *G06F 3/0446* (2019.05); *G06F 2203/04111* (2013.01)

(58) Field of Classification Search
None
See application file for complete search history.

(56) References Cited

U.S. PATENT DOCUMENTS

| | | | |
|---|---|---|---|
| 9,851,855 B2 | 12/2017 | Bok | |
| 11,023,074 B2 | 6/2021 | Lee et al. | |
| 11,460,966 B2 | 10/2022 | Kim et al. | |
| 11,500,501 B2 | 11/2022 | Lee et al. | |
| 2017/0090630 A1* | 3/2017 | Kim | G06F 3/0443 |
| 2022/0004282 A1* | 1/2022 | Lee | G06F 3/0448 |

FOREIGN PATENT DOCUMENTS

| KR | 10-2020-0008276 A | 1/2020 |
|---|---|---|
| KR | 10-2021-0106039 A | 8/2021 |
| KR | 10-2022-0005246 A | 1/2022 |

* cited by examiner

*Primary Examiner* — Stephen T. Reed
(74) *Attorney, Agent, or Firm* — F. CHAU & ASSOCIATES, LLC

(57) ABSTRACT

An electronic device includes a display layer and a sensor layer. The sensor layer includes a plurality of first electrode groups arranged in a first direction, a plurality of second electrode groups arranged in a second direction crossing the first direction, and a plurality of trace lines electrically connected to the plurality of first electrode groups and the plurality of second electrode groups and at least partially overlapping the display area. Each of the plurality of first electrode groups includes a 1-1st electrode and a 1-2nd electrode spaced apart from each other in the second direction, and each of the plurality of second electrode groups includes a 2-1st electrode and a 2-2nd electrode spaced from each other in the first direction.

20 Claims, 16 Drawing Sheets

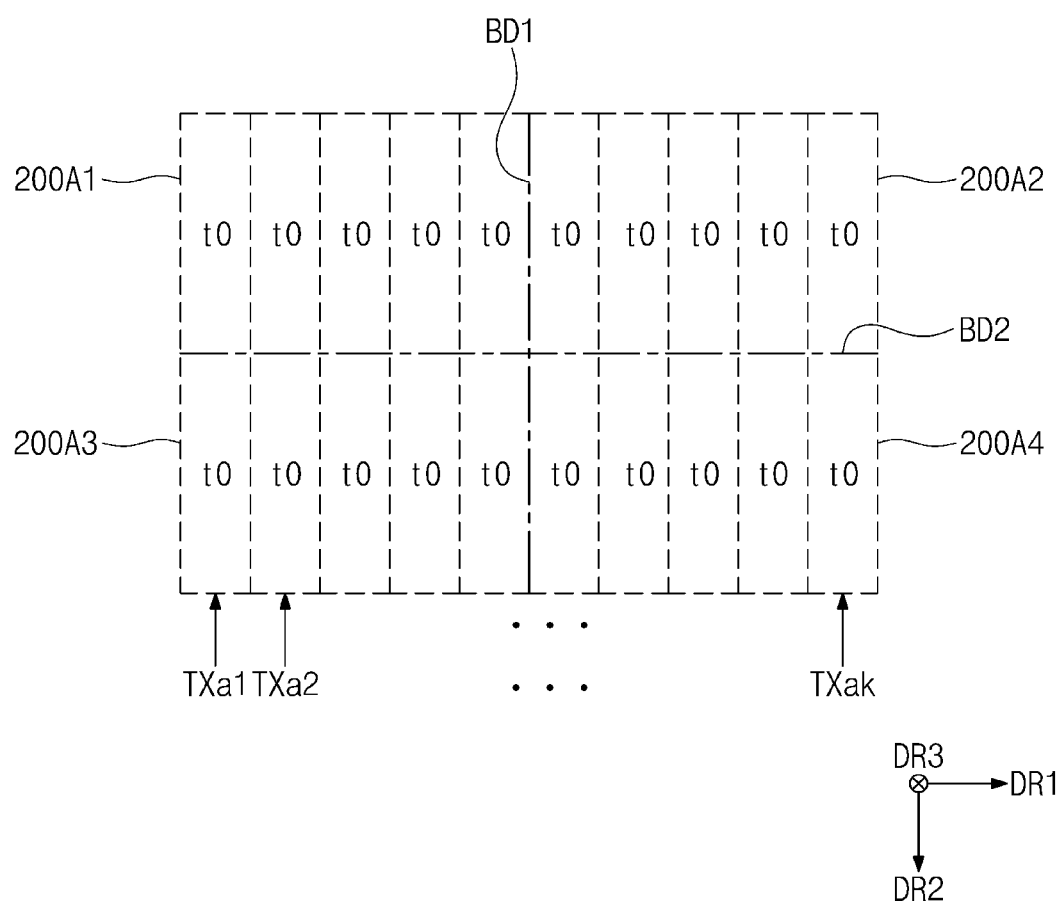

ELECTRONIC DEVICE

CROSS-REFERENCE TO RELATED APPLICATIONS

This application claims priority under 35 U.S.C. § 119 to Korean Patent Application No. 10-2023-0033188, filed on Mar. 14, 2023, in the Korean Intellectual Property Office, the disclosure of which is incorporated by reference herein in its entirety.

TECHNICAL FIELD

Embodiments of the present disclosure relate to an electronic device including a sensor having increased sensing performance.

DISCUSSION OF RELATED ART

Multimedia electronic devices such as a TV, a mobile phone, a tablet personal computer (PC), a navigation system, a game console, and the like typically include a display that displays an image. In addition to a general input method such as a button, a keyboard, a mouse, or the like, the electronic devices may include an input sensor capable of providing a touch-based input method that allows a user to enter information or commands easily and intuitively. The input sensor may sense touch or pressure by using the user's body.

SUMMARY

Embodiments of the present disclosure provide an electronic device having increased sensing performance.

According to an embodiment, an electronic device includes a display layer on which a display area and a non-display area disposed adjacent to the display area are defined, and a sensor layer disposed on the display layer. The sensor layer includes a plurality of first electrode groups arranged in a first direction, a plurality of second electrode groups arranged in a second direction crossing the first direction, and a plurality of trace lines electrically connected to the plurality of first electrode groups and the plurality of second electrode groups and at least partially overlapping the display area. Each of the plurality of first electrode groups includes a 1-1st electrode and a 1-2nd electrode spaced apart from each other in the second direction, and each of the plurality of second electrode groups includes a 2-1st electrode and a 2-2nd electrode spaced apart from each other in the first direction.

The plurality of trace lines may include a 1-1st trace line electrically connected to the 1-1st electrode, a 1-2nd trace line electrically connected to the 1-2nd electrode, a 2-1st trace line electrically connected to the 2-1st electrode, and a 2-2nd trace line electrically connected to the 2-2nd electrode. The 1-1st trace line, the 2-1st trace line, and the 2-2nd trace line may overlap the display area.

A length of the 1-1st trace line may be longer than a length of the 1-2nd trace line. The 1-1st trace line may include a first extension line overlapping the display area and connected to the 1-1st electrode, and a second extension line overlapping the display area and connected to the 1-1st electrode.

Each of the 2-1st trace line and the 2-2nd trace line may not overlap the plurality of first electrode groups.

The 2-1st electrode may include a plurality of patterns spaced apart from each other in the first direction, and a bridge pattern electrically connected to the plurality of patterns. The 1-1st trace line may intersect and be insulated from the bridge pattern.

The bridge pattern, the 2-1st trace line, and the 2-2nd trace line may be included in a first conductive layer. The plurality of first electrode groups and the plurality of patterns may be included in a second conductive layer different from the first conductive layer.

The 1-1st trace line may include a first portion included in the first conductive layer, and a second portion included in the second conductive layer. The second portion may intersect and be insulated from the bridge pattern in an insulation scheme.

The plurality of trace lines and the plurality of first electrode groups may be included in a first conductive layer. The plurality of second electrode groups may be included in a second conductive layer different from the first conductive layer.

The first conductive layer may further include a plurality of first dummy patterns that are electrically insulated from the plurality of trace lines and the plurality of first electrode groups. The second conductive layer may further include a plurality of second dummy patterns electrically insulated from the plurality of second electrode groups.

The electronic device may further include a sensor driver that drives the sensor layer. A boundary may be defined on the sensor layer in the second direction. The sensor driver may simultaneously output a transmission signal to first electrode groups, which are positioned in a boundary area including the boundary, from among the plurality of first electrode groups.

The boundary may be a division driving boundary line, and the sensor driver may sequentially output a plurality of transmission signals to the plurality of first electrode groups so as to be symmetric with respect to the boundary.

The electronic device may further include a sensor driver that drives the sensor layer. A plurality of transmission signals may be simultaneously provided to the plurality of first electrode groups, respectively. A first transmission signal and a second transmission signal among the plurality of transmission signals may be different from each other.

The electronic device may further include a sensor driver that drives the sensor layer. The sensor driver may simultaneously output a transmission signal to the 1-1st electrode and the 1-2nd electrode.

Each of the plurality of trace lines may include a first mesh line. Each of the plurality of first electrode groups or each of the plurality of second electrode groups may include a second mesh line. A width of the second mesh line may be greater than a width of the first mesh line.

According to an embodiment, an electronic device includes a sensor layer in which a first sensing area, a second sensing area, a third sensing area, and a fourth sensing area are defined. The sensor layer includes a plurality of first electrode groups arranged in a first direction and each of which includes a 1-1st electrode and a 1-2nd electrode spaced apart from each other in a second direction crossing the first direction, a plurality of second electrode groups arranged in the second direction and each of which includes a 2-1st electrode and a 2-2nd electrode spaced apart from each other in the first direction, a 1-1st trace line connected to the 1-1st electrode via the third sensing area or the fourth sensing area, a 1-2nd trace line connected to the 1-2nd electrode, a 2-1st trace line overlapping at least one of the first to fourth sensing areas and connected to the 2-1st electrode, and a 2-2nd trace line overlapping at least one of the first to fourth sensing areas and connected to the 2-2nd electrode.

A length of the 1-1st trace line may be longer than a length of the 1-2nd trace line. The 1-1st trace line may include a first extension line connected to the 1-1st electrode, and a second extension line connected to the 1-1st electrode.

The electronic device may further include a sensor driver that drives the sensor layer. The sensor driver may simultaneously output a transmission signal to the 1-1st electrode and the 1-2nd electrode.

According to an embodiment, an electronic device includes a display layer on which a display area and a non-display area disposed adjacent to the display area are defined, a sensor layer disposed on the display layer and that senses an external input, and a sensor driver that drives the sensor layer. The sensor layer includes a plurality of first electrode groups arranged in a first direction, a plurality of second electrode groups arranged in a second direction crossing the first direction, and a plurality of trace lines electrically connected to the plurality of first electrode groups and the plurality of second electrode groups and at least partially overlapping the display area. Each of the plurality of first electrode groups includes a 1-1st electrode and a 1-2nd electrode, which are spaced apart from each other in the second direction. The sensor driver simultaneously outputs a transmission signal to the 1-1st electrode and the 1-2nd electrode.

Each of the plurality of second electrode groups may include a 2-1st electrode and a 2-2nd electrode spaced apart from each other in the first direction. The plurality of trace lines may include a 1-1st trace line electrically connected to the 1-1st electrode, a 1-2nd trace line electrically connected to the 1-2nd electrode, a 2-1st trace line electrically connected to the 2-1st electrode, and a 2-2nd trace line electrically connected to the 2-2nd electrode. The 1-1st trace line, the 2-1st trace line, and the 2-2nd trace line overlap the display area.

A length of the 1-1st trace line may be longer than a length of the 1-2nd trace line. The 1-1st trace line may include a first extension line overlapping the display area and connected to the 1-1st electrode, and a second extension line overlapping the display area and connected to the 1-1st electrode.

BRIEF DESCRIPTION OF THE DRAWINGS

The above and other objects and features of the present disclosure will become apparent by describing in detail embodiments thereof with reference to the accompanying drawings.

FIG. 11 is a diagram for describing an operation of a sensor layer, according to an embodiment of the present disclosure.

DETAILED DESCRIPTION

Figure 1:
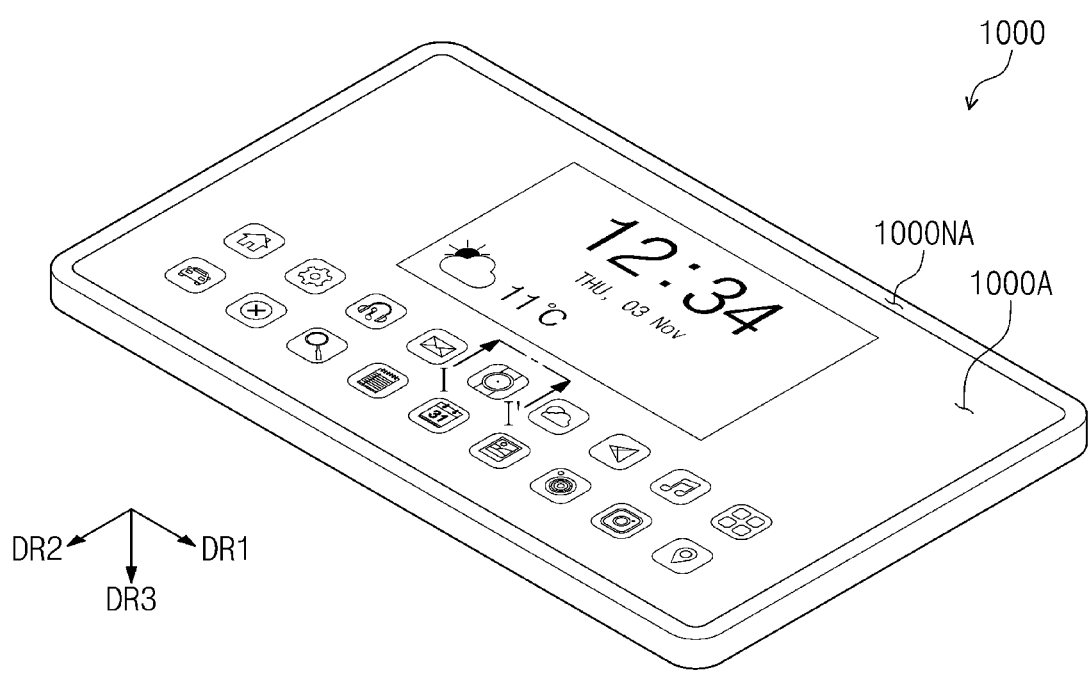
FIG. 1 is a perspective view of an electronic device, according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component.

The articles "a," "an," and "the" are singular in that they have a single referent, but the use of the singular form in the specification should not preclude the presence of more than one referent.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Herein, the terms "part" and "unit" mean a software component or hardware component that performs a specific function. For example, the hardware component may include a field-programmable gate array (FPGA) or an application-specific integrated circuit (ASIC). The software component may refer to executable codes and/or data used by the executable codes in an addressable storage medium. Accordingly, the software components may be, for example, object-oriented software components, class components, and task components, and may include processes, functions, attributes, procedures, subroutines, program code segments, drivers, firmware, microcodes, circuits, data, databases, data structures, tables, arrays, or variables.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a perspective view of an electronic device 1000, according to an embodiment of the present disclosure.

Referring to FIG. 1, an electronic device 1000 may be a device activated depending on an electrical signal. For example, the electronic device 1000 may be a mobile phone, a foldable mobile phone, a notebook computer, a television, a tablet PC, a car navigation system, a game console, or a wearable device, but is not limited thereto. FIG. 1 illustrates that the electronic device 1000 is a tablet PC.

An active area 1000A and a peripheral area 1000NA may be defined in the electronic device 1000. The electronic device 1000 may display an image through the active area 1000A. The active area 1000A may include a surface defined by a first direction DR1 and a second direction DR2. The peripheral area 1000NA may be disposed adjacent to or surround the peripheral area of the active area 1000A. In an embodiment of the present disclosure, the peripheral area 1000NA may be omitted.

A thickness direction of the electronic device 1000 may be parallel to a third direction DR3 intersecting the first direction DR1 and the second direction DR2. That is, the thickness direction may correspond to the third direction DR3. Accordingly, front surfaces (or upper surfaces) and back surfaces (or lower surfaces) of members constituting the electronic device 1000 may be defined with respect to the third direction DR3.

In FIG. 1, a bar-type electronic device 1000 is illustrated as an example, but the present disclosure is not limited thereto. For example, descriptions described below may be applied to various electronic devices such as a foldable electronic device 1000, a rollable electronic device 1000, or a slideable electronic device 1000.

Figure 2:
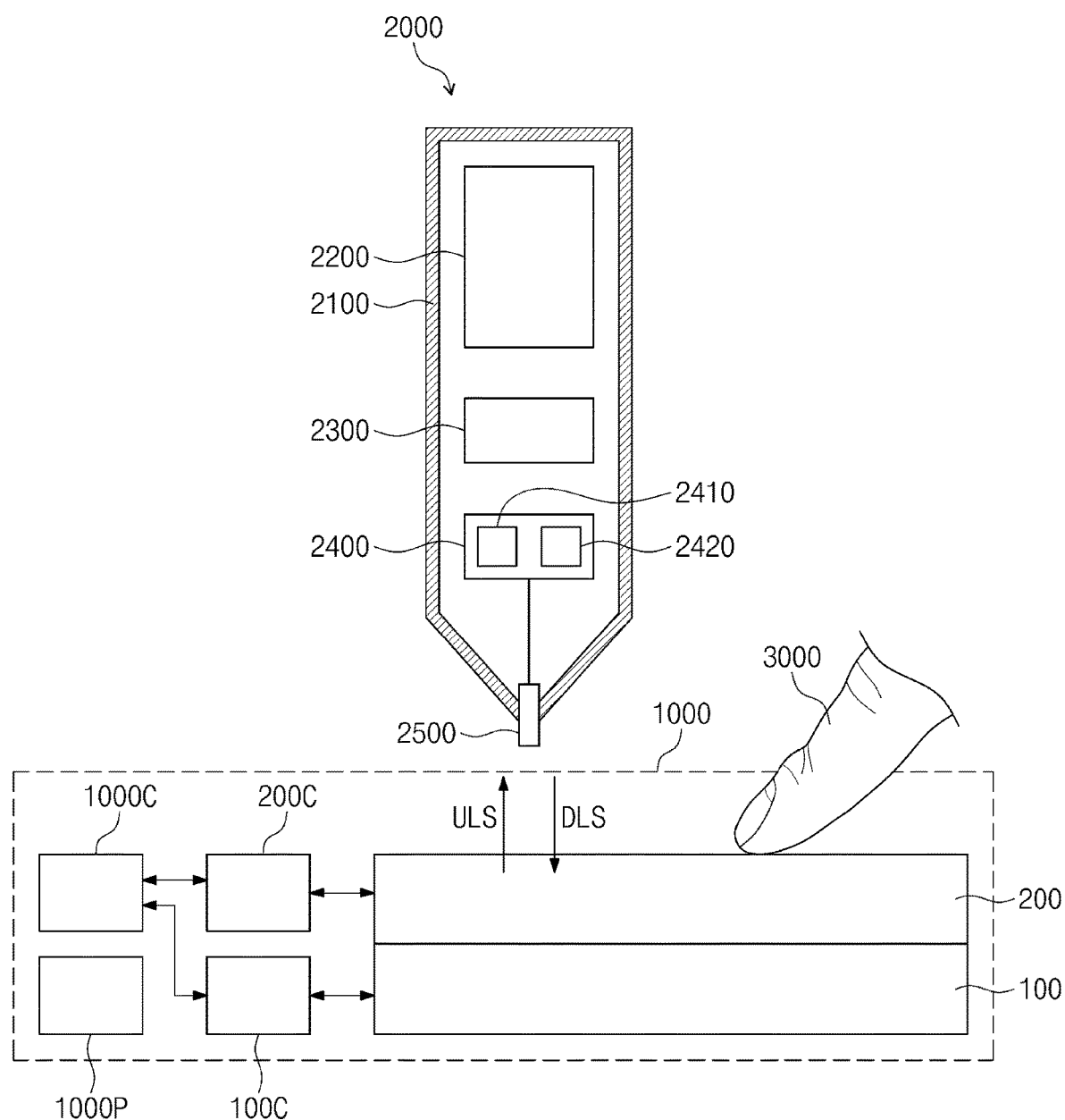
FIG. 2 is a block diagram for describing the operation of an electronic device, according to an embodiment of the present disclosure.

FIG. 2 is a block diagram for describing the operation of the electronic device 1000, according to an embodiment of the present disclosure.

Referring to FIG. 2, the display device 1000 may include a display layer 100, a sensor layer 200, a display driver 100C, a sensor driver 200C, a main driver 1000C, and a power supply circuit 1000P.

The display layer 100 may be a component that substantially generates an image. The display layer 100 may be, for example, a light emitting display layer. For example, the display layer 100 may be an organic light emitting display layer, an inorganic light emitting display layer, an organic-inorganic light emitting display layer, a quantum dot display layer, a micro-LED display layer, or a nano-LED display layer, but is not particularly limited thereto.

The sensor layer 200 may be disposed on the display layer 100. The sensor layer 200 may sense an external input applied from outside of the electronic device 1000. For example, the sensor layer 200 may detect both an active input (or referred to as a "second type input") by an input device 2000 and a passive input (or referred to as a "first type input") by a touch 3000. The touch 3000 may include all input means capable of providing a change in capacitance, such as, for example, a user's body or an input device (e.g., a pen). However, this is only an example. For example, the sensor layer 200 may detect only the passive input by the touch 3000 according to embodiments.

The main driver 1000C may control overall operations of the electronic device 1000. For example, the main driver 1000C may control operations of the display driver 100C and the sensor driver 200C. The main driver 1000C may include at least one microprocessor, and the main driver 1000C may be referred to as a "host". The main driver 1000C may further include a graphic controller.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock signal, and a data enable signal.

The sensor driver 200C may drive the sensor layer 200. The sensor driver 200C may receive a control signal from the main driver 1000C. The control signal may include a clock signal and a mode determination signal that determines a driving mode of the sensor driver 200C. The sensor driver 200C may be selectively driven in a first mode in which a passive input is detected or a second mode in which an active input is detected based on the control signal.

The power supply circuit 1000P may include a power management integrated circuit (PMIC). The power supply circuit 1000P may generate a plurality of driving voltages that drive the display layer 100, the sensor layer 200, the display driver 100C, and the sensor driver 200C. For example, the plurality of driving voltages may include a gate high voltage, a gate low voltage, an ELVSS voltage, an ELVDD voltage, an initialization voltage, and the like, but are not particularly limited thereto.

The electronic device 1000 and the input device 2000 may communicate with each other in both directions. The electronic device 1000 may provide an uplink signal ULS to the input device 2000. For example, the uplink signal ULS may include a synchronization signal or information of the electronic device 1000, but is not particularly limited thereto. The input device 2000 may provide a downlink signal DLS to the electronic device 1000. The downlink signal DLS may include a synchronization signal or state information of the input device 2000. For example, the downlink signal DLS may include coordinate information of the input device 2000, battery information of the input device 2000, slope information of the input device 2000, and/or various pieces of information stored in the input device 2000, but is not particularly limited thereto. The uplink signal ULS and the downlink signal DLS may be provided or received through the sensor layer 200.

The input device 2000 may include housing 2100, a power supply 2200, a controller 2300, a communication module 2400, and a pen tip 2500. However, the components constituting the input device 2000 are not limited to the listed components. For example, the input device 2000 may further include an electrode switch that switches an operating mode to a signal transmission mode or a signal reception mode, a pressure sensor that senses pressure, a memory that stores predetermined information, or a rotation sensor that senses rotation.

The housing 2100 may have a pen shape, and an accommodation space may be formed in the housing 2100. The power supply 2200, the controller 2300, the communication module 2400, and the pen tip 2500 may be accommodated in the accommodation space defined inside the housing 2100.

The power supply 2200 may supply a power source to the controller 2300 and the communication module 2400 inside the input device 2000. The power supply 2200 may include a battery or a high-capacity capacitor.

The controller 2300 may control the operation of the input device 2000. The controller 2300 may be, for example, an application-specific integrated circuit (ASIC). The controller 2300 may be configured to operate depending on a designed program.

The communication module 2400 may include a transmission circuit 2410 and a reception circuit 2420. The transmission circuit 2410 may output the downlink signal DLS to the sensor layer 200. The reception circuit 2420 may receive the uplink signal ULS provided from the sensor layer 200. The transmission circuit 2410 may receive a signal provided from the controller 2300 and may modulate the signal into a signal capable of being sensed by the sensor layer 200. The reception circuit 2420 may modulate a signal provided from the sensor layer 200 into a signal processable by the controller 2300.

The pen tip 2500 may be electrically connected to the communication module 2400. A portion of the pen tip 2500 may protrude from the housing 2100. Alternatively, the input device 2000 may further include cover housing that covers the portion of the pen tip 2500 exposed by the housing 2100. Alternatively, the pen tip 2500 may be embedded in the housing 2100.

Figure 3A:
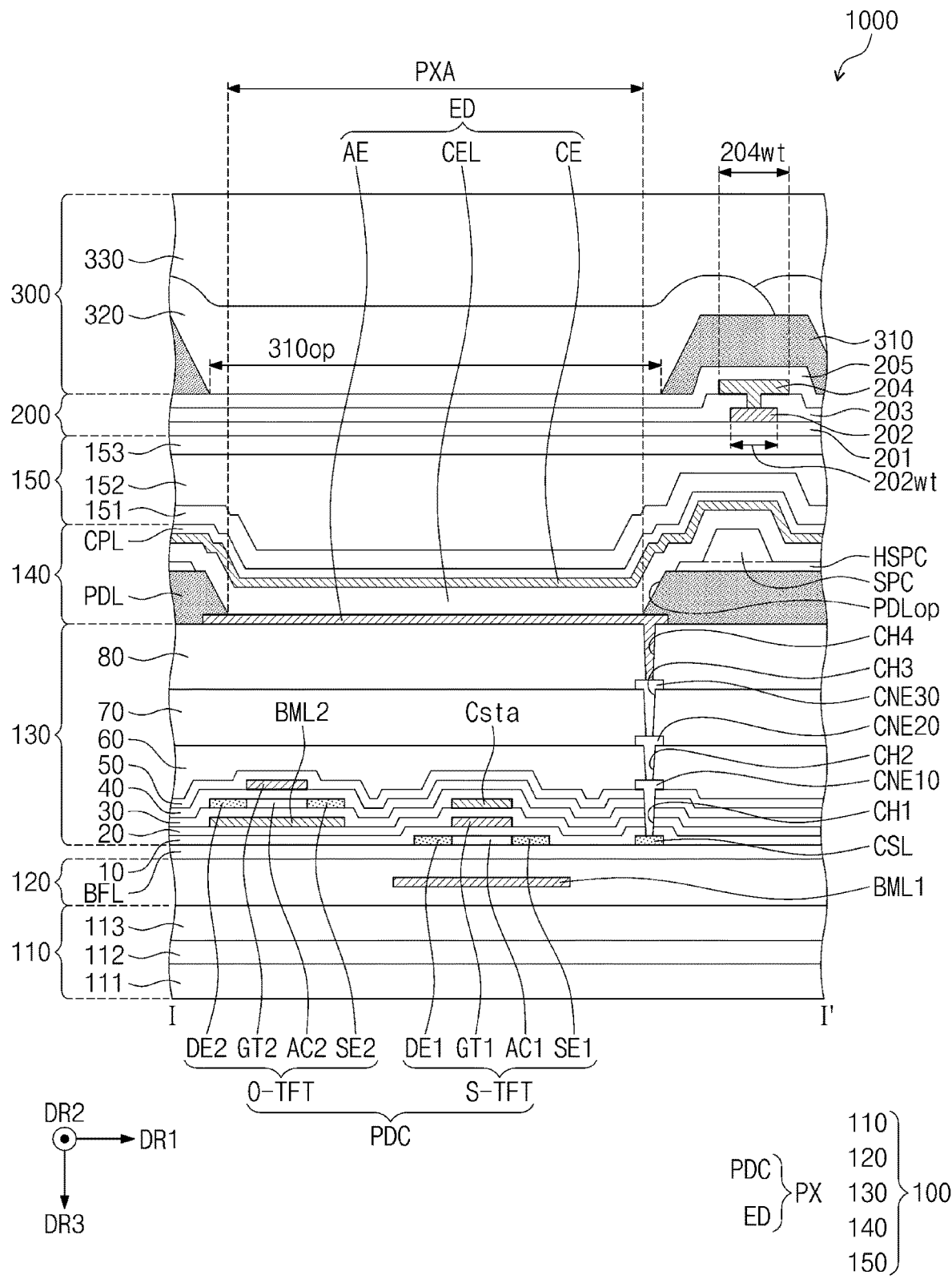
FIG. 3A is a cross-sectional view of an electronic device, according to an embodiment of the present disclosure.
Figure 3B:
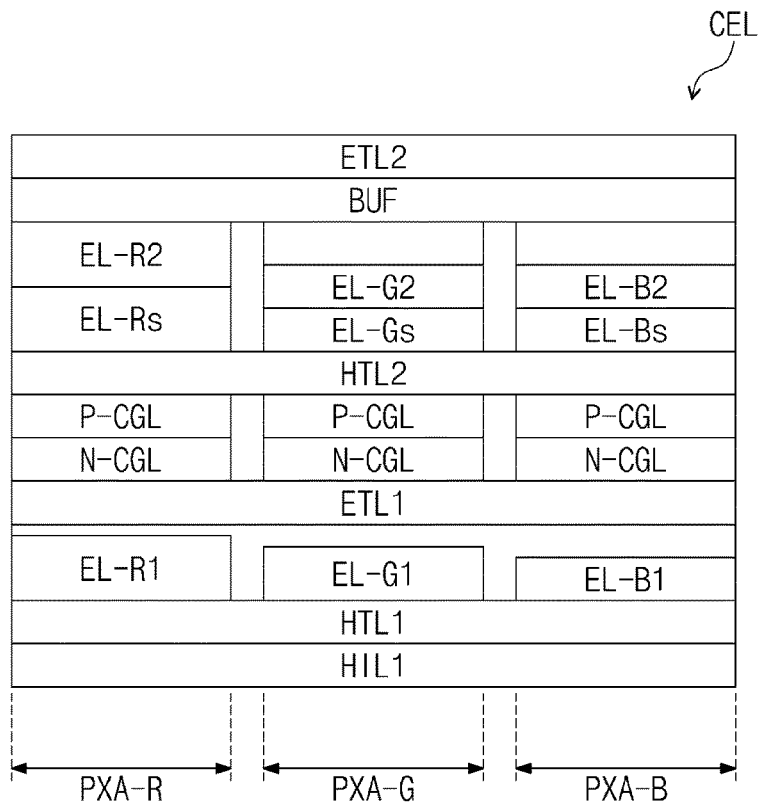
FIG. 3B is a cross-sectional view of an intermediate layer, according to an embodiment of the present disclosure.

FIG. 3A is a cross-sectional view of the electronic device 1000, according to an embodiment of the present disclosure. FIG. 3B is a cross-sectional view of an intermediate layer CEL, according to an embodiment of the present disclosure. For example, FIG. 3A may be a cross-sectional view taken along line I-I' of FIG. 1.

Referring to FIG. 3A, the electronic device 1000 may include the display layer 100, the sensor layer 200, and an anti-reflection layer 300. The display layer 100 may include a base layer 110, a barrier layer 120, a buffer layer BFL, a circuit layer 130, an element layer 140, and an encapsulation layer 150.

The base layer 110 may have a single layer or multi-layer structure. For example, the base layer 110 may be a glass substrate having a single layer structure. Alternatively, the base layer 110 may include a first sub-base layer 111, a second sub-base layer 112, and a third sub-base layer 113. Each of the first sub-base layer 111 and the third sub-base layer 113 may include, for example, at least one of polyimide-based resin, acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. Herein, "~~"-based resin in the specification means including the functional group of "~~". For example, each of the first sub-base layer 111 and the third sub-base layer 113 may include polyimide.

The second sub-base layer 112 may have a single layer or multi-layer structure. For example, the second sub-base layer 112 may include an inorganic material, and may include at least one of silicon oxide, silicon nitride, silicon oxynitride, and amorphous silicon. For example, the second sub-base layer 112 may include silicon oxynitride and silicon oxide stacked thereon.

The barrier layer 120 may be disposed on the base layer 110. The barrier layer 120 may have a single layer or multi-layer structure. For example, the barrier layer 120 may include at least one of silicon oxide, silicon nitride, silicon oxynitride, and amorphous silicon.

The barrier layer 120 may further include a first lower light-shielding layer BML1. For example, when the barrier layer 120 has a multi-layer structure, the first lower light-shielding layer BML1 may be interposed between layers constituting the barrier layer 120. However, embodiments are not limited thereto, and the first lower light-shielding layer BML1 may be interposed between the base layer 110 and the barrier layer 120 or may be disposed on the barrier layer 120. In an embodiment, the first lower light-shielding layer BML1 may be omitted. The first lower light-shielding layer BML1 may also be referred to as a "first lower layer", a "first lower metal layer", a "first lower electrode layer", a "first lower shielding layer", a "first light-shielding layer", a "first metal layer", a "first shielding layer", or a "first overlapping layer".

The buffer layer BFL may be disposed on the barrier layer 120. The buffer layer BFL may prevent metal atoms or impurities from being spread into a first semiconductor pattern. In addition, the buffer layer BFL may adjust the speed of applying heat during a crystallization process that forms the first semiconductor pattern, such that the first semiconductor pattern is uniformly formed.

The buffer layer BFL may include a plurality of inorganic layers. For example, the buffer layer BFL may include a first sub buffer layer including silicon nitride, and a second sub buffer layer disposed on the first sub buffer layer and including silicon oxide.

The circuit layer 130 may be disposed on the buffer layer BFL. The element layer 140 may be disposed on the circuit layer 130. A pixel PX may include a pixel circuit PDC and a light emitting element ED electrically connected to the pixel circuit PDC. The pixel circuit PDC may be included in the circuit layer 130. The light emitting element ED may be included in the element layer 140.

FIG. 3A shows a silicon thin film transistor S-TFT and an oxide thin film transistor O-TFT of the pixel circuit PDC. However, all transistors constituting the pixel circuit PDC may be silicon thin film transistors S-TFT or all oxide thin film transistors O-TFT according to embodiments.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 3A illustrates only a portion of the first semiconductor pattern disposed on the buffer layer BFL. Another portion of the first semiconductor pattern may be further disposed in another area. The first semiconductor pattern may be arranged across pixels according to a specific rule. The first semiconductor pattern may have different electrical characteristics depending on whether the first semiconductor pattern is doped. The first semiconductor pattern may include a first area having high conductivity and a second area having low conductivity (e.g., relative to the first area). The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

The conductivity of the first area is greater than the conductivity of the second area. The first area may substantially serve as an electrode or a signal line. The second area may substantially correspond to an active area (or a channel) of a transistor. In other words, a part of the first semiconductor pattern may be an active area of the transistor, another part thereof may be a source or drain of the transistor, and another part thereof may be a connection electrode or a connection signal line. A portion of a connection signal line CSL formed from the first semiconductor pattern is illustrated in FIG. 3A.

A source area SE1, an active area AC1, and a drain area DE1 of the silicon thin film transistor S-TFT may be formed from the first semiconductor pattern. The source area SE1 and the drain area DE1 may extend in directions opposite to each other from the active area AC1, when viewed in a cross-sectional view.

The circuit layer 130 may include a plurality of inorganic layers and a plurality of organic layers. In an embodiment, a first insulating layer 10, a second insulating layer 20, a third insulating layer 30, a fourth insulating layer 40, and a fifth insulating layer 50 sequentially stacked on the buffer layer BFL may be inorganic layers, and a sixth insulating layer 60, a seventh insulating layer 70, and an eighth insulating layer 80 may be organic layers.

The first insulating layer 10 may be disposed on the buffer layer BFL. The first insulating layer 10 may cover the first semiconductor pattern. The first insulating layer 10 may be, for example, an inorganic layer and/or an organic layer, and may have a single layer or multi-layer structure. The first insulating layer 10 may include at least one of, for example, an aluminum oxide, a titanium oxide, a silicon oxide, silicon nitride, a silicon oxynitride, a zirconium oxide, and a hafnium oxide. In an embodiment, the first insulating layer 10 may be a silicon oxide layer having a single layer structure. Not only the first insulating layer 10, but also an insulating layer of the circuit layer 130 to be described further below may have a single layer structure or a multi-layer structure.

A gate electrode GT1 of the silicon thin film transistor S-TFT is disposed on the first insulating layer 10. The gate electrode GT1 may be a portion of a metal pattern. The gate electrode GT1 overlaps the active area AC1. The gate electrode GT1 may function as a mask in a process of doping the first semiconductor pattern. The gate electrode GT1 may include, for example, titanium, silver, alloy containing silver, molybdenum, alloy containing molybdenum, aluminum, alloy containing aluminum, aluminum nitride, tungsten, tungsten nitride, copper, indium tin oxide, or indium zinc oxide, but is not particularly limited thereto.

The second insulating layer 20 is disposed on the first insulating layer 10 and may cover the gate electrode GT1. The second insulating layer 20 may be, for example, an inorganic layer, and may have a single layer structure or a multi-layer structure. The second insulating layer 20 may include at least one of, for example, silicon oxide, silicon nitride, and silicon oxynitride. In an embodiment, the second insulating layer 20 may have a single layer structure including a silicon nitride layer.

The third insulating layer 30 may be disposed on the second insulating layer 20. The third insulating layer 30 may be, for example, an inorganic layer, and may have a single layer structure or a multi-layer structure. For example, the third insulating layer 30 may have a multi-layer structure including a silicon oxide layer and a silicon nitride layer. One electrode Csta of a capacitor may be interposed between the second insulating layer 20 and the third insulating layer 30, and the other electrode of the capacitor may be interposed between the first insulating layer 10 and the second insulating layer 20.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially serves as a source/drain area of a transistor or a signal line. The non-reduction area substantially corresponds to an active area (alternatively, a semiconductor area or a channel) of the transistor. In other words, a part of the second semiconductor pattern may be the active area of the transistor, another part thereof may be the source/drain area of the transistor, and another part thereof may be a signal transmission area.

A source area SE2, an active area AC2, and a drain area DE2 of the oxide thin film transistor O-TFT may be formed from the second semiconductor pattern. The source area SE2 and the drain area DE2 may extend in directions opposite to each other from the active area AC2, when viewed in a cross-sectional view.

The fourth insulating layer 40 may be disposed on the third insulating layer 30. The fourth insulating layer 40 may cover the second semiconductor pattern. The fourth insulating layer 40 may be, for example, an inorganic layer, and may have a single layer structure or a multi-layer structure. The fourth insulating layer 40 may include at least one of, for example, an aluminum oxide, a titanium oxide, a silicon oxide, silicon nitride, a silicon oxynitride, a zirconium oxide, and a hafnium oxide. In an embodiment, the fourth insulating layer 40 may have a single layer structure including silicon oxide.

The gate electrode GT2 of the oxide thin film transistor O-TFT is disposed on the fourth insulating layer 40. The gate electrode GT2 may be a portion of a metal pattern. The gate electrode GT2 overlaps the active area AC2. The gate electrode GT2 may function as a mask in a process of reducing the second semiconductor pattern.

A second lower light-shielding layer BML2 may be disposed under the oxide thin film transistor O-TFT. The second lower light-shielding layer BML2 may be interposed between the second insulating layer 20 and the third insulating layer 30. The second lower light-shielding layer BML2 may include the same material as the one electrode Csta constituting the capacitor and may be formed through the same process.

The fifth insulating layer 50 may be disposed on the fourth insulating layer 40 and may cover the gate electrode GT2. The fifth insulating layer 50 may be, for example, an inorganic layer and/or an organic layer, and may have a single layer structure or a multi-layer structure. For example, the fifth insulating layer 50 may have a multi-layer structure including a silicon oxide layer and a silicon nitride layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

The sixth insulating layer 60 may be disposed on the fifth insulating layer 50. A second connection electrode CNE20 may be disposed on the fifth insulating layer 60. The second connection electrode CNE20 may be connected to the first connection electrode CNE10 through a second contact hole CH2 penetrating the sixth insulating layer 60.

The seventh insulating layer 70 may be disposed on the sixth insulating layer 60 and may cover the second connection electrode CNE20.

A third connection electrode CNE30 may be disposed on the seventh insulating layer 70. The third connection electrode CNE30 may be connected to the second connection electrode CNE20 through a third contact hole CH3 penetrating the seventh insulating layer 70. The eighth insulating layer 80 may be disposed on the seventh insulating layer 70 and may cover the third connection electrode CNE30.

Each of the sixth insulating layer 60, the seventh insulating layer 70, and the eighth insulating layer 80 may be an organic layer. For example, each of the sixth insulating layer 60, the seventh insulating layer 70, and the eighth insulating layer 80 may include general purpose polymers such as benzocyclobutene (BCB), polyimide, hexamethyldisiloxane (HMDSO), polymethylmethacrylate (PMMA), or polystyrene (PS), polymer derivatives having a phenolic group, an acrylic polymer, an imide-based polymer, an arylether-based polymer, an amide-based polymer, a fluorine-based polymer, a p-xylene-based polymer, a vinyl alcohol-based polymer, or the blend thereof.

The light emitting element ED may include a first electrode AE, the intermediate layer CEL, and a second electrode CE. The intermediate layer CEL has a multi-layer structure, and a detailed description thereof will be described below. Some of the layers constituting the intermediate layer CEL and the second electrode CE may be provided in common to pixels PX. The first electrode AE may be referred to as a "pixel electrode" or "anode". The second electrode CE may be referred to as a "common electrode" or "cathode".

The first electrode AE may be disposed on the eighth insulating layer 80. The first electrode AE may be connected to the third connection electrode CNE30 electrically connected to the pixel circuit PDC through a fourth contact hole CH4 penetrating the eighth insulating layer 80.

In an embodiment of the present disclosure, the third connection electrode CNE30 may be omitted. In this case, the first electrode AE may be connected to the second connection electrode CNE20 by penetrating the seventh and eighth insulating layers 70 and 80. Moreover, in an embodiment of the present disclosure, the third connection electrode CNE30 and the eighth insulating layer 80 may be omitted. In this case, the first electrode AE may be disposed on the seventh insulating layer 70 and may be connected to the second connection electrode CNE20 by penetrating the seventh insulating layer 70.

The first electrode AE may be, for example, a semi-transmissive electrode, a transmissive electrode, or a reflective electrode. According to an embodiment, the anode AE may include a reflective layer formed of, for example, silver, magnesium, aluminum, platinum, palladium, gold, nickel, neodymium, iridium, chromium, or a compound thereof, and a transparent or semi-transparent electrode layer formed on the reflective layer. The transparent or semi-transparent electrode layer may include at least one of, for example, indium tin oxide, indium zinc oxide, indium gallium zinc oxide, zinc oxide or indium oxide, and aluminum-doped zinc oxide. For example, the first electrode AE may include a multi-layer structure in which indium tin oxide, silver, and indium tin oxide are sequentially stacked.

A pixel defining layer PDL may be disposed on the eighth insulating layer 80. The pixel defining layer PDL may have a property of absorbing light. For example, the pixel defining layer PDL may have a black color. The pixel defining layer PDL may include a black coloring agent. The black coloring agent may include a black dye and a black pigment. The black coloring agent may include, for example, carbon black, a metal such as chromium, or an oxide thereof.

An opening PDLop exposing one portion of the first electrode AE may be defined in the pixel defining layer PDL. That is, the pixel defining layer PDL may cover the edge of the first electrode AE. A light emitting area PXA may be defined by the pixel defining layer PDL.

A spacer HSPC may be disposed on the pixel defining layer PDL. A protruding spacer SPC may be disposed on the spacer HSPC. The spacer HSPC and the protruding spacer SPC may have an integral shape and may be formed of the same material as each other. For example, the spacer HSPC and the protruding spacer SPC may be formed through the same process as each other by a halftone mask. However, this is only an example and is not limited thereto. For example, the spacer HSPC and the protruding spacer SPC may include different materials from each other or may be formed by separate processes.

Referring to FIGS. 3A and 3B together, the plurality of light emitting areas PXA may be provided, and the plurality of light emitting areas PXA may include a first light emitting area PXA-R, a second light emitting area PXA-G, and a third light emitting area PXA-B. For example, the first light emitting area PXA-R may be a red light emitting area, the second light emitting area PXA-G may be a green light emitting area, and the third light emitting area PXA-B may be a blue light emitting area.

The intermediate layer CEL may be disposed on the first electrode AE. The intermediate layer CEL may include a first hole injection layer HIL1, a first hole transport layer HTL1, first light emitting layers EL-R1, EL-G1, and EL-B1, a first electron transport layer ETL1, charge generation layers N-CGL and P-CGL, a second hole transport layer HTL2, auxiliary layers EL-Rs, EL-Gs, and EL-Bs, second light emitting layers EL-R2, EL-G2, and EL-B2, a buffer layer BUF, and a second electron transport layer ETL2. However, this is only an example, and embodiments are not limited thereto. For example, according to embodiments, some of the components included in the intermediate layer CEL may be omitted, and the intermediate layer CEL may further include other components.

The first hole injection layer HIL1 and the first hole transport layer HTL1 may be disposed over the first to third light emitting areas PXA-R, PXA-G, and PXA-B. The first light emitting layers EL-R1, EL-G1, and EL-B1 may be disposed in corresponding first to third light emitting areas PXA-R, PXA-G, and PXA-B, respectively. The first light emitting layers EL-R1, EL-G1, and EL-B1 may include, for example, organic, inorganic, or organic-inorganic materials that emit light of a predetermined color. The first electron transport layer ETL1 may be disposed on the first light emitting layers EL-R1, EL-G1, and EL-B1, and may be disposed over the first to third light emitting areas PXA-R, PXA-G, and PXA-B.

The charge generation layers N-CGL and P-CGL may include the first charge generation layers N-CGL and the second charge generation layers P-CGL. The first charge generation layers N-CGL may be an organic layer including an N-type dopant, and the second charge generation layers P-CGL may be an organic layer including a P-type dopant. The first charge generation layers N-CGL are disposed on the first electron transport layer ETL1, and may be disposed in each of the first to third light emitting areas PXA-R, PXA-G, and PXA-B. The second charge generation layers P-CGL may be disposed on the first charge generation layers N-CGL, respectively.

The second hole transport layer HTL2 may be disposed on the second charge generation layers P-CGL, and may be disposed over the first to third light emitting areas PXA-R, PXA-G, and PXA-B. The auxiliary layers EL-Rs, EL-Gs, and EL-Bs may be disposed on the second hole transport layer HTL2, and may be disposed in the first to third light emitting areas PXA-R, PXA-G, and PXA-B, respectively. The auxiliary layers EL-Rs, EL-Gs, and EL-Bs may be layers that serve to increase luminous efficiency of a dopant and a host. For example, auxiliary layers may be further interposed between the first hole transport layer HTL1 and the first light emitting layers EL-R1, EL-G1, and EL-B1.

The second light emitting layers EL-R2, EL-G2, and EL-B2 may be disposed on the auxiliary layers EL-Rs, EL-Gs, and EL-Bs, respectively. The buffer layer BUF may be disposed on the second light emitting layers EL-R2, EL-G2, and EL-B2. The second electron transport layer ETL2 may be disposed on the buffer layer BUF. The buffer layer BUF and the second electron transport layer ETL2 may be disposed over the first to third light emitting areas PXA-R, PXA-G, and PXA-B.

The second electrode CE may be disposed on the second electron transport layer ETL2. The second electrode CE may be disposed in the display area. The second electrode CE may be disposed over the first to third light emitting areas PXA-R, PXA-G, and PXA-B.

The element layer 140 may further include a capping layer CPL disposed on the second electrode CE. The capping layer CPL may increase emission efficiency by the principle of constructive interference. For example, the capping layer CPL may include a material having a refractive index of 1.6 or higher for light having a wavelength of about 589 nm. The capping layer CPL may be, for example, an organic capping layer including organic materials, an inorganic capping layer including inorganic materials, or a composite capping layer including organic and inorganic materials. For example, the capping layer may include a carbocyclic compound, a heterocyclic compound, an amine group-containing compound, porphine derivatives, phthalocyanine derivatives, naphthalocyanine derivatives, alkali metal complexes, alkaline earth metal complexes, or any combination thereof. The carbocyclic compound, the heterocyclic compound, and the amine group-containing compound may be selectively replaced with a substituent including oxygen (O), nitrogen (N), sulfur (S), selenium (Se), silicon (Si), fluorine (F), chlorine (Cl), bromine (Br), iodine (I), or any combination thereof.

The encapsulation layer 150 may be disposed on the element layer 140. The encapsulation layer 150 may include a first inorganic encapsulation layer 151, an organic encapsulation layer 152, and a second inorganic encapsulation layer 153 that are sequentially stacked. The first and second inorganic encapsulation layers 151 and 153 may protect the element layer 140 from, for example, moisture and oxygen, and the organic encapsulation layer 152 may protect the element layer 140 from a foreign substance such as, for example, dust particles.

In an embodiment of the present disclosure, a low refractive index layer may be further interposed between the capping layer CPL and the encapsulation layer 150. The low refractive index layer may include lithium fluoride. The low refractive index layer may be formed in a thermal evaporation process.

The sensor layer 200 may be disposed on the display layer 100. The sensor layer 200 may also be referred to as a "sensor layer", an "input sensing layer", or an "input sensing panel". The sensor layer 200 may include a sensor base layer 201, a first conductive layer 202, a sensor insulating layer 203, a second conductive layer 204, and a sensor cover layer 205.

The sensor base layer 201 may be directly disposed on the display layer 100. The sensor base layer 201 may be, for example, an inorganic layer including at least one of silicon nitride, silicon oxynitride, and silicon oxide. Alternatively, the sensor base layer 201 may be an organic layer including, for example, an epoxy resin, an acrylate resin, or an imide-based resin. The sensor base layer 201 may have a single layer structure or may have a multi-layer structure stacked in the third direction DR3.

Each of the first conductive layer 202 and the second conductive layer 204 may have a single layer structure or may have a multi-layer structure stacked in the third direction DR3.

A conductive layer of a single layer structure may include a metal layer or a transparent conductive layer. The metal layer may include, for example, molybdenum (Mo), silver (Ag), titanium (Ti), copper (Cu), aluminum (Al), or an alloy thereof. The transparent conductive layer may include a transparent conductive oxide such as, for example, indium tin oxide (ITO), indium zinc oxide (IZO), zinc oxide (ZnO), indium zinc tin oxide (IZTO), or the like. The transparent conductive layer may include a conductive polymer such as, for example, poly(3,4-ethylenedioxythiophene) (PEDOT), a metal nano wire, graphene, and the like.

A conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

A second width 204wt of a mesh line included in the second conductive layer 204 may be greater than a first width 202wt of a mesh line included in the first conductive layer 202, but is not particularly limited thereto. The width of the mesh line may mean a width of a direction intersecting with an extension direction of the mesh line.

The sensor insulating layer 203 may be interposed between the first conductive layer 202 and the second conductive layer 204. The sensor insulating layer 203 may include an inorganic film. The inorganic film may include at least one of, for example, aluminum oxide, titanium oxide, silicon oxide, silicon nitride, silicon oxynitride, zirconium oxide, and hafnium oxide.

Alternatively, the sensor insulating layer 203 may include an organic film. The organic film may include at least one of, for example, acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

The sensor cover layer 205 may be disposed on the sensor insulating layer 203 and may cover the second conductive layer 204. The second conductive layer 204 may include a conductive pattern. The sensor cover layer 205 may cover the conductive pattern and may reduce or eliminate the probability that the conductive pattern is damaged in a subsequent process. The sensor cover layer 205 may include an inorganic material. For example, the sensor cover layer 205 may include silicon nitride, but is not particularly limited thereto. In an embodiment of the present disclosure, the sensor cover layer 205 may be omitted.

The anti-reflection layer 300 may be disposed on the sensor layer 200. The anti-reflection layer 300 may include a division layer 310, a plurality of color filters 320, and a planarization layer 330.

The division layer 310 may overlap the conductive pattern of the second conductive layer 204. The sensor cover layer 205 may be interposed between the division layer 310 and the second conductive layer 204. When the sensor cover layer 205 is omitted, the division layer 310 may directly contact the second conductive layer 204 and may cover at least part of the second conductive layer 204. The division layer 310 may prevent reflection of external light by the second conductive layer 204. As long as a material absorbs light, the material constituting the division layer 310 is not particularly limited thereto. The division layer 310 may be a layer having a black color and, in an embodiment, the division layer 310 may include a black coloring agent. The black coloring agent may include, for example, a black dye and a black pigment. The black coloring agent may include, for example, carbon black, a metal such as chromium, or an oxide thereof.

A division opening 310op may be defined in the division layer 310. The division opening 310op may overlap the opening PDLop of the pixel defining layer PDL. The color filter 320 may be disposed to correspond to the division opening 310op. The color filter 320 may transmit light provided from the intermediate layer CEL that overlaps the color filter 320.

The planarization layer 330 may cover the division layer 310 and the color filter 320. The planarization layer 330 may include an organic material, and may provide a planarization surface on an upper surface of the planarization layer 330. In an embodiment, the planarization layer 330 may be omitted.

In an embodiment of the present disclosure, the anti-reflection layer 300 may include a reflection adjustment layer instead of the color filters 320. For example, in the illustration of FIG. 3A, the color filter 320 may be omitted, and a reflection adjustment layer may be added at a location where the color filter 320 is omitted. The reflection adjustment layer may selectively absorb light in a partial band among light reflected from inside the display panel and/or an electronic device or light incident from the outside of the display panel and/or the electronic device.

For example, the reflection adjustment layer may absorb light in a first wavelength between about 490 nm and about 505 nm and light in a second wavelength between about 585 nm and about 600 nm such that light transmittance in the first wavelength and the second wavelength becomes about 40% or less. The reflection adjustment layer may absorb light having a wavelength out of a wavelength range of red, green, and blue light emitted from the intermediate layer CEL. As such, the reflection adjustment layer may absorb light having a wavelength that does not belong to a wavelength range of red, green, or blue emitted from the intermediate layer CEL, thereby preventing or reducing a decrease in the luminance of a display panel and/or an electron device. According to embodiments, the decrease in luminous efficiency of the display panel and/or electron device may be prevented or reduced, and visibility may be increased at the same time.

The reflection adjustment layer may be provided with an organic material layer including, for example, dyes, pigments, or a combination thereof. The reflection adjustment layer may include, for example, a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and a combination thereof.

In an embodiment, the reflection adjustment layer may have the transmittance of about 64% to about 72%. The transmittance of the reflection adjustment layer may be adjusted depending on the amount of pigment and/or dye included in the reflection adjustment layer.

In an embodiment of the present disclosure, the anti-reflection layer 300 may include a phase retarder and/or a polarizer. The anti-reflection layer 300 may include at least one polarizing film. In this case, the anti-reflection layer 300 may be attached to the sensor layer 200 through an adhesive layer.

Figure 3C:
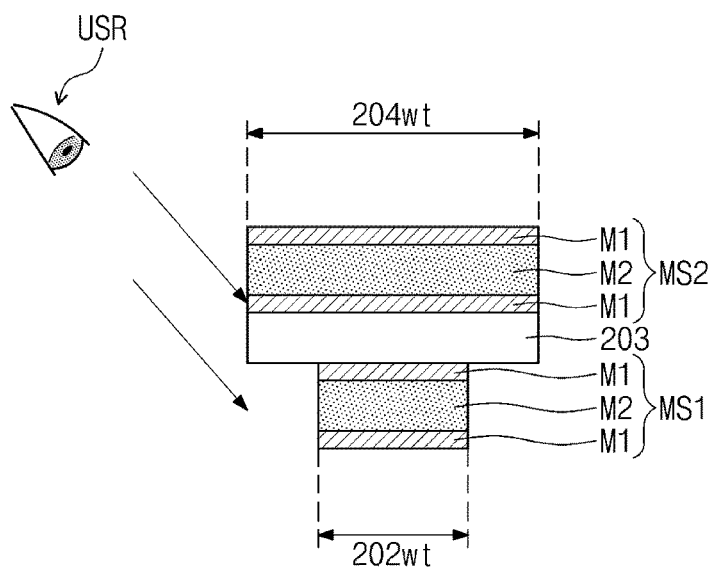
FIG. 3C is a cross-sectional view of a sensor layer, according to an embodiment of the present disclosure.

FIG. 3C is a cross-sectional view of the sensor layer 200 (see FIG. 3A), according to an embodiment of the present disclosure.

Referring to FIGS. 3A and 3C, the second width 204wt of a second mesh line MS2 included in the second conductive layer 204 may be greater than the first width 202wt of a first mesh line MS1 included in the first conductive layer 202. In an embodiment of the present disclosure, the first mesh line MS1 may be included in one of trace lines 200t (see FIG.

4B). The second mesh line MS2 may be included in first electrode groups 210 (see FIG. 4B) or second electrode groups 220 (see FIG. 4B).

Each of the first mesh line MS1 and the second mesh line MS2 may include first metal layers M1 and a second metal layer M2 interposed between the first metal layers M1. The first metal layers M1 may include, for example, titanium (Ti), and the second metal layer M2 may include, for example, aluminum (Al). However, this is only an example and embodiments are not particularly limited thereto.

When a user USR views the first mesh line MS1 and the second mesh line MS2 from a side, the first mesh line MS1 has a smaller width than the second mesh line MS2, and thus, the first mesh line MS1 may not be visually perceived by the user USR.

Figure 4A:
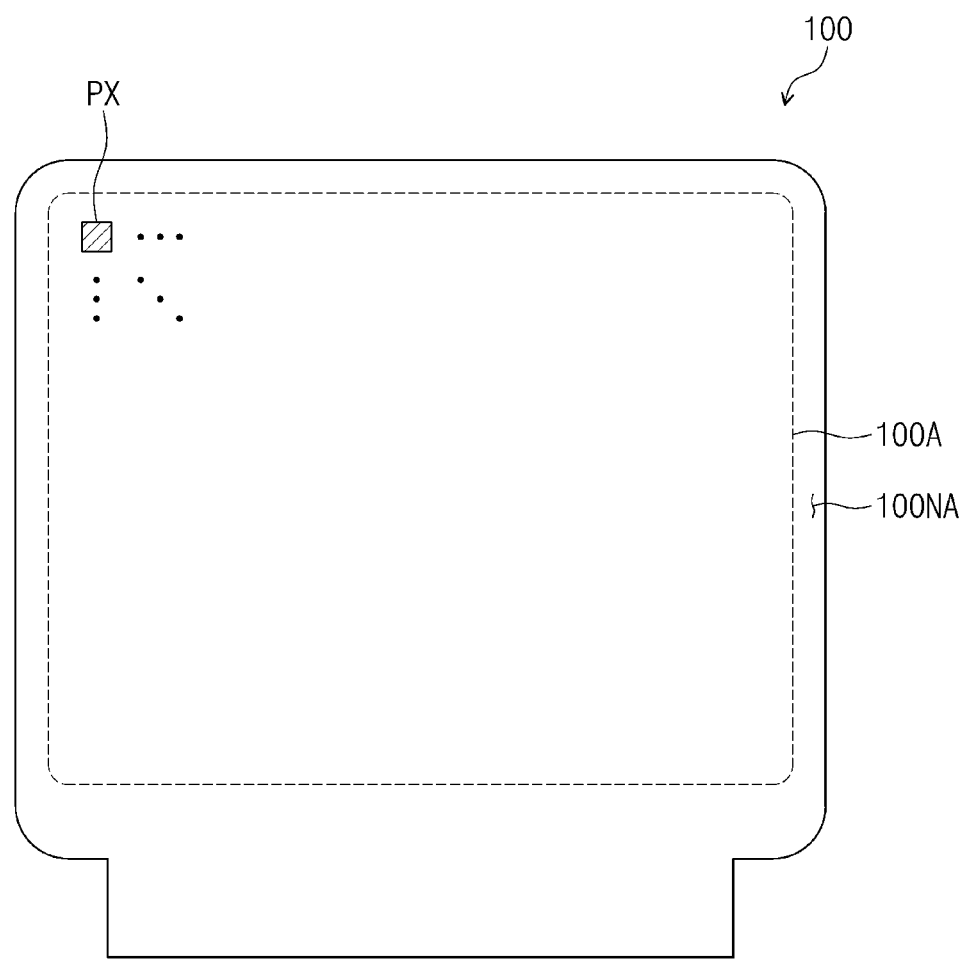
FIG. 4A is a plan view of a display layer, according to an embodiment of the present disclosure.

FIG. 4A is a plan view of the display layer 100, according to an embodiment of the present disclosure.

Referring to FIG. 4A, the display layer 100 includes a display area 100A and a non-display area 100NA respectively corresponding to the active area 1000A (see FIG. 1) and the peripheral area 1000NA (see FIG. 1) of the electronic device 1000 (see FIG. 1). In this specification, "an area/portion corresponds to another area/portion" means "the area/portion overlaps the other area/portion", but is not limited to the same area size as each other.

According to embodiments, an image may be displayed in the display area 100A, and an image is not displayed in the non-display area 100NA. A plurality of pixels PX may be positioned in the display area 100A. The non-display area 100NA may be disposed adjacent to the display area 100A. For example, the non-display area 100NA may surround the display area 100A. However, embodiments are not limited thereto. For example, the shape of the display area 100A and the shape of the non-display area 100NA may be variously modified.

Figure 4B:
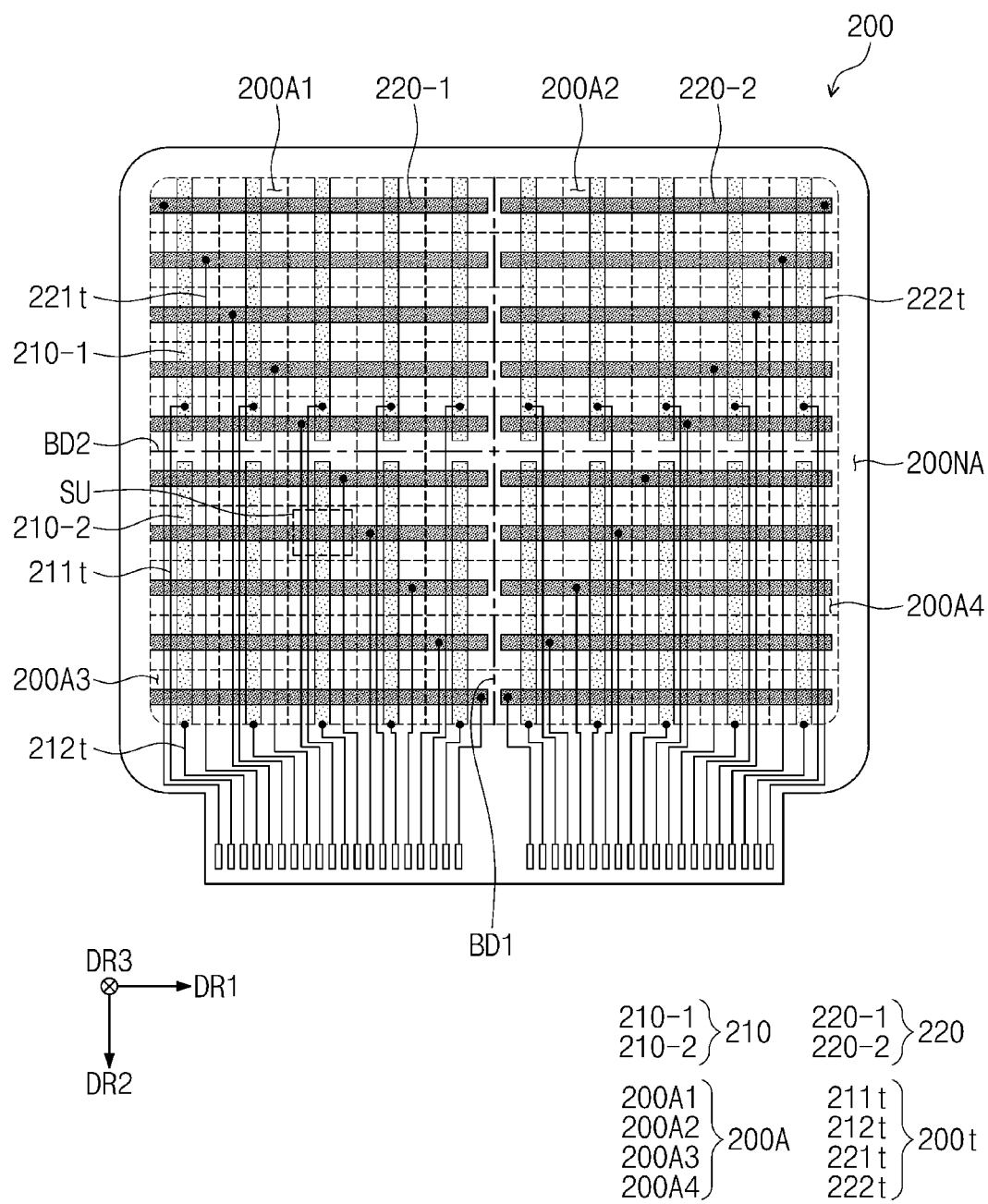
FIG. 4B is a plan view of a sensor layer, according to an embodiment of the present disclosure.

FIG. 4B is a plan view of the sensor layer 200, according to an embodiment of the present disclosure.

Referring to FIGS. 4A and 4B, a sensing area 200A and a peripheral area 200NA adjacent to the sensing area 200A may be defined in the sensor layer 200. The sensing area 200A may overlap the display area 100A. The peripheral area 200NA may overlap the non-display area 100NA.

According to an embodiment of the present disclosure, a first boundary BD1 extending in the second direction DR2 and a second boundary BD2 extending in the first direction DR1 may be defined in the sensing area 200A of the sensor layer 200. The sensing area 200A may include a first sensing area 200A1, a second sensing area 200A2, a third sensing area 200A3, and a fourth sensing area 200A4, which are divided by the first boundary BD1 and the second boundary BD2.

The first sensing area 200A1 and the second sensing area 200A2 may be disposed adjacent to each other in the first direction DR1. The third sensing area 200A3 and the fourth sensing area 200A4 may be disposed adjacent to each other in the first direction DR1. The first sensing area 200A1 and the third sensing area 200A3 may be disposed adjacent to each other in the second direction DR2. The second sensing area 200A2 and the fourth sensing area 200A4 may be disposed adjacent to each other in the second direction DR2.

The sensor layer 200 may include a plurality of first electrode groups 210 and a plurality of second electrode groups 220 disposed in the sensing area 200A. The first electrode groups 210 may be arranged in the first direction DR1. The second electrode groups 220 may be arranged in the second direction DR2 crossing the first direction DR1.

Each of the first electrode groups 210 may include a 1-1st electrode 210-1 and a 1-2nd electrode 210-2, which are spaced apart from each other in the second direction DR2. The 1-1st electrode 210-1 and the 1-2nd electrode 210-2 may be spaced apart from each other with the second boundary BD2 interposed therebetween. Each of the 1-1st electrode 210-1 and the 1-2nd electrode 210-2 may extend in the second direction DR2.

Each of the second electrode groups 220 may include a 2-1st electrode 220-1 and a 2-2nd electrode 220-2, which are spaced apart from each other in the first direction DR1. The 2-1st electrode 220-1 and the 2-2nd electrode 220-2 may be spaced apart from each other with the first boundary BD1 interposed therebetween. Each of the 2-1st electrode 220-1 and the 2-2nd electrode 220-2 may extend in the first direction DR1.

FIG. 4B shows that each of the 1-1st electrode 210-1, the 1-2nd electrode 210-2, the 2-1st electrode 220-1, and the 2-2nd electrode 220-2 has a bar shape, but embodiments are not limited thereto. Moreover, FIG. 4B illustrates that the sensing area 200A is divided into two sensing areas in the first direction DR1 and is divided into two sensing areas in the second direction DR2, but embodiments are not particularly limited thereto. For example, the sensing area 200A may be divided into two or more sensing areas in the first direction DR1, and may be divided into two or more sensing areas in the second direction DR2.

The 1-1st electrodes 210-1 of the first electrode groups 210 may be arranged in the first direction DR1 and may be disposed in the first sensing area 200A1 and the second sensing area 200A2. The 1-2nd electrodes 210-2 of the first electrode groups 210 may be arranged in the first direction DR1 and may be disposed in the third sensing area 200A3 and the fourth sensing area 200A4. The 2-1st electrodes 220-1 of the second electrode groups 220 may be arranged in the second direction DR2 and may be disposed in the first sensing area 200A1 and the third sensing area 200A3. The 2-2nd electrodes 220-2 of the second electrode groups 220 may be arranged in the second direction DR2 and may be disposed in the second sensing area 200A2 and the fourth sensing area 200A4.

The width of the sensing area 200A in the first direction DR1 or the width of the sensing area 200A in the second direction DR2 may be increased by the aspect ratio or product type of the electronic device 1000 (see FIG. 1). When each of the first electrode groups 210 includes only one first electrode, or when each of the second electrode groups 220 includes only one second electrode, the load on the first electrode or the load on the second electrode may be increased. An increase in the load of each of the electrodes constituting the sensor layer 200 may cause a signal delay and a decrease in sensing sensitivity.

According to an embodiment of the present disclosure, to reduce the load on the first or second electrode, each of the first electrode groups 210 may include the 1-1st electrode 210-1 and the 1-2nd electrode 210-2, and each of the second electrode groups 220 may include the 2-1st electrode 220-1 and the 2-2nd electrode 220-2. As the length of a first electrode or second electrode decreases, the load on the first electrode or second electrode may be reduced. Accordingly, touch sensitivity of the sensor layer 200 may be increased.

In FIG. 4B, the 10 first electrode groups 210 and the 10 second electrode groups 220 are shown, but the number of first electrode groups 210 and the number of second electrode groups 220 are not particularly limited thereto. For example, the number of first electrode groups 210 and the number of second electrode groups 220 may be variously changed depending on the aspect ratio or screen size of the electronic device 1000 (see FIG. 1).

A plurality of sensing units SU may be defined in the sensor layer 200. Each of the sensing units SU may correspond to an area where one first electrode group of the first electrode groups 210 intersects one second electrode group of the second electrode groups 220. FIG. 4B illustrates that the 100 sensing units SU are defined in the sensor layer 200, but the number of sensing units SU may be changed depending on the number of the first electrode groups 210 and the number of the second electrode groups 220.

The sensor layer 200 may further include a plurality of trace lines 200t, which are electrically connected to the first electrode groups 210 and the second electrode groups 220 and which at least partially overlap the display area 100A.

In an embodiment of the present disclosure, at least some of the trace lines 200t may extend to overlap the sensing area 200A. For example, in an embodiment, the trace lines 200t are not disposed in the peripheral area 200NA adjacent to the sensing area 200A in the first direction DR1. Accordingly, the area size of the peripheral area 200NA may be reduced. As a result, an area occupied by the peripheral area 1000NA (see FIG. 1) may be reduced on the front surface of the electronic device 1000 (see FIG. 1), thereby implementing a narrow bezel.

The trace lines 200t may include a 1-1st trace line 211t electrically connected to the 1-1st electrode 210-1, a 1-2nd trace line 212t electrically connected to the 1-2nd electrode 210-2, a 2-1st trace line 221t electrically connected to the 2-1st electrode 220-1, and a 2-2nd trace line 222t electrically connected to the 2-2nd electrode 220-2.

In an embodiment of the present disclosure, the 1-1st trace line 211t, the 2-1st trace line 221t, and the 2-2nd trace line 222t, which are connected thereto, may overlap the display area 100A and the sensing area 200A. FIG. 4B illustrates that the 1-2nd trace line 212t does not overlap the display area 100A and the sensing area 200A, but embodiments are not particularly limited thereto. For example, at least one portion of the 1-2nd trace line 212t may also overlap the display area 100A and the sensing area 200A according to embodiments.

In an embodiment of the present disclosure, the 1-1st trace line 211t may be electrically connected to the 1-1st electrode 210-1, which is disposed in the first sensing area 200A1, via the third sensing area 200A3. Alternatively, the 1-1st trace line 211t may be electrically connected to the 1-1st electrode 210-1, which is disposed in the second sensing area 200A2, via the fourth sensing area 200A4.

In an embodiment of the present disclosure, each of the 2-1st trace line 221t and the 2-2nd trace line 222t may overlap at least one of first to fourth sensing areas 200A1, 200A2, 200A3, and 200A4. For example, the 2-1st trace line 221t may overlap the first sensing area 200A1 and the third sensing area 200A3, and may be electrically connected to the 2-1st electrode 220-1, which is disposed in the first sensing area 200A1. Alternatively, the 2-1st trace line 221t may overlap the third sensing area 200A3 and may be electrically connected to the 2-1st electrode 220-1 disposed in the third sensing area 200A3. The 2-2nd trace line 222t may overlap the second sensing area 200A2 and the fourth sensing area 200A4, and may be electrically connected to the 2-2nd electrode 220-2 disposed in the second sensing area 200A2. Alternatively, the 2-2nd trace line 222t may overlap the fourth sensing area 200A4 and may be electrically connected to the 2-2nd electrode 220-2 disposed in the fourth sensing area 200A4.

Figure 5A:
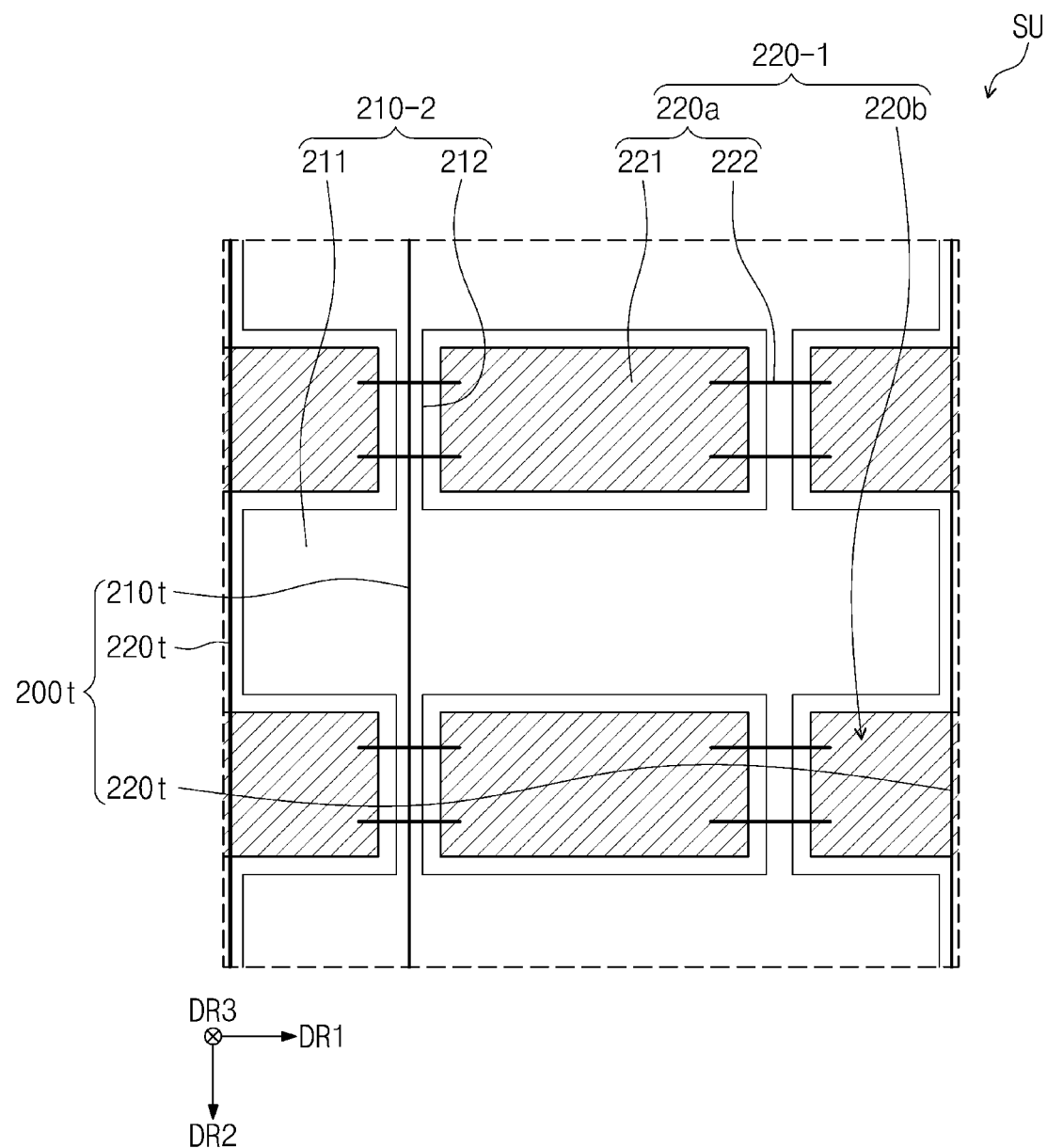
FIG. 5A is a plan view illustrating a sensing unit of a sensor layer, according to an embodiment of the present disclosure.

FIG. 5A is a plan view illustrating a sensing unit SU of the sensor layer 200 (see FIG. 4B), according to an embodiment of the present disclosure.

Referring to FIGS. 4B and 5A, one sensing unit SU is illustrated. The sensing unit SU may include one portion of one first electrode group of the first electrode groups 210 and one portion of one second electrode group of the second electrode groups 220. In FIG. 5A, the sensing unit SU including one portion of the 1-2nd electrode 210-2 and one portion of the 2-1st electrode 220-1 is representatively described.

The 1-2nd electrode 210-2 may include a sensing portion 211 and a bridge portion 212. The sensing portion 211 and the bridge portion 212 may have integral shapes with each other and may be disposed on the same layer. The sensing portion 211 may be referred to as a "pattern portion" or a "first portion", and the bridge portion 212 may be referred to as a "connection portion" or a "second portion".

The 2-1st electrode 220-1 may include a first sub-division electrode 220a and a second sub-division electrode 220b, which are spaced apart from each other in the second direction DR2, and each of which extends in the first direction DR1. The first sub-division electrode 220a and the second sub-division electrode 220b may constitute one channel. FIG. 5A illustrates that the one 2-1st electrode 220-1 includes two sub-division electrodes 220a and 220b, but the number is not limited thereto.

Each of the first and second sub-division electrodes 220a and 220b may include sensing patterns 221 and bridge patterns 222 disposed on a layer different from that of the sensing patterns 221. The sensing patterns 221 may be spaced from one another in the first direction DR1, and the bridge patterns 222 may electrically connect the sensing patterns 221, which are adjacent to one another, to one another. FIG. 5A illustrates that two sensing patterns 221 adjacent to each other are electrically connected to each other by two bridge patterns 222, but embodiments are not particularly limited thereto.

The sensing portion 211, the bridge portion 212, and the sensing pattern 221 may be disposed on the same layer. The bridge patterns 222 may be disposed on a layer different from that of the sensing portion 211, the bridge portion 212, and the sensing pattern 221. For example, the sensing portion 211, the bridge portion 212, and the sensing pattern 221 may be included in the second conductive layer 204 (see FIG. 3A), and the bridge patterns 222 may be a configuration included in the first conductive layer 202 (see FIG. 3A). In this case, the sensor layer 200 has a structure in which the bridge patterns 222 are positioned to be closer to the display layer 100 than the sensing patterns 221. Accordingly, the sensor layer 200 may have a bottom bridge structure. However, this is only an example and embodiments are not limited thereto. The sensing portion 211, the bridge portion 212, and the sensing pattern 221 may be included in the first conductive layer 202 (see FIG. 3A), and the bridge patterns 222 may be a configuration included in the second conductive layer 204 (see FIG. 3A). In this case, the sensor layer 200 may have a top bridge structure.

FIG. 5A shows three trace lines 200t that overlap or are adjacent to the sensing unit SU. The trace lines 200t may include a first trace line 210t and second trace lines 220t. The first trace line 210t may be electrically connected to the first electrode group 210. The second trace lines 220t may be electrically connected to the second electrode groups 220, respectively.

According to an embodiment of the present disclosure, the first trace line 210t may overlap the 1-2nd electrode 210-2. Furthermore, according to an embodiment, the first trace line 210t may minimally overlap the 2-1st electrode 220-1. According to an embodiment, the second trace lines 220t may overlap the 2-1st electrode 220-1 and does not overlap the 1-1st electrode 210-1. For example, the second trace lines 220t may overlap the sensing pattern 221. In this case, the noise capacitance between the 1-1st electrode 210-1 and the second trace line 220t and the noise capacitance between the 2-1st electrode 220-1 and the first trace line 210t may be reduced, thereby removing or reducing ghost touch issues. That is, the electronic device 1000 (see FIG. 1) with increased sensing performance may be provided.

Figure 5B:
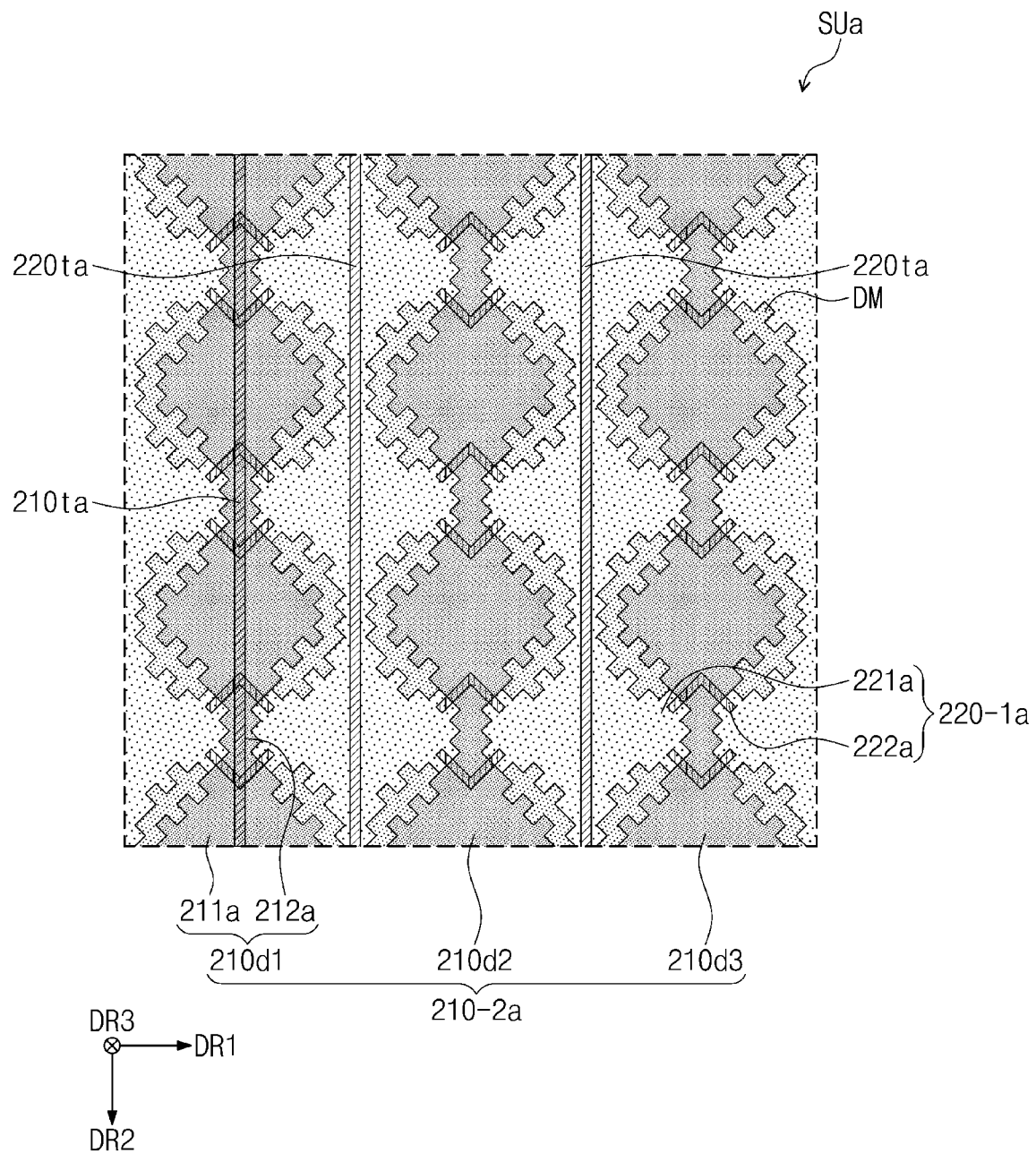
FIG. 5B is a plan view illustrating a sensing unit of a sensor layer, according to an embodiment of the present disclosure.

FIG. 5B is a plan view illustrating a sensing unit SUa of the sensor layer 200 (see FIG. 4B), according to an embodiment of the present disclosure.

Referring to FIGS. 4B and 5B, one sensing unit SUa is illustrated. The sensing unit SUa may include one portion of one first electrode group of the first electrode groups 210 and one portion of one second electrode group of the second electrode groups 220. In FIG. 5B, the sensing unit SUa including one portion of the 1-2nd electrode 210-2a and one portion of the 2-1st electrode 220-1a is representatively described.

The one 1-2nd electrode 210-2a may include a plurality of division electrodes 210d1, 210d2, and 210d3. The division electrodes 210d1, 210d2, and 210d3 may constitute one channel. In FIG. 5B, the one 1-2nd electrode 210-2a includes the three division electrodes 210d1, 210d2, and 210d3, but the number of division electrodes 210d1, 210d2, and 210d3 is not particularly limited thereto. The division electrodes 210d1, 210d2, and 210d3 may be arranged spaced apart from one another in the first direction DR1. Each of the division electrodes 210d1, 210d2, and 210d3 may extend in the second direction DR2.

Second trace lines 220ta may be interposed between the division electrodes 210d1, 210d2, and 210d3. For example, one second trace line 220ta may be interposed between the two adjacent division electrodes 210d1 and 210d2. Another second trace line 220ta may be interposed between the two adjacent division electrodes 210d2 and 210d3. The one second trace line 220ta and the other second trace line 220ta may be electrically connected to a 2-1st electrodes 220-1a included in the sensing units SUa other than the sensing unit SUa shown in FIG. 5B.

According to an embodiment of the present disclosure, when viewed from above a plane (e.g., when viewed in the third direction DR3), the second trace lines 220ta do not overlap the 1-2nd electrode 210-2a. Accordingly, the effect of signal interference or parasitic capacitance between the 1-2nd electrode 210-2a and the second trace lines 220ta may be minimized or reduced.

The 2-1st electrode 220-1a may include sensing patterns 221a and bridge patterns 222a disposed on a layer different from that of the sensing patterns 221a. The sensing patterns 221a may be spaced from one another in the first direction DR1, and the bridge patterns 222a may electrically connect the sensing patterns 221a disposed adjacent to each other. In FIG. 5B, the two sensing patterns 221a adjacent to each other are electrically connected to each other by the six bridge patterns 222a, but embodiments are not particularly limited thereto. The second trace lines 220ta may be disposed on the same layer as the bridge patterns 222a, and the second trace lines 220ta may overlap the sensing patterns 221a.

Each of the division electrodes 210d1, 210d2, and 210d3 may include a sensing portion 211a and a bridge portion 212a. The sensing portion 211a and the bridge portion 212a may have integral shapes with each other and may be disposed on the same layer. The sensing portion 211a may be referred to as a "pattern portion" or a "first portion", and the bridge portion 212a may be referred to as a "connection portion" or a "second portion". Alternatively, the sensing portion 211a may be referred to as a "first sensing pattern", the bridge portion 212a may also be referred to as a "first bridge pattern", the sensing pattern 221 may also be referred to as a "second sensing pattern", and, the bridge pattern 222 may also be referred to as a "second bridge pattern".

According to an embodiment of the present disclosure, the first trace line 210ta may be positioned between the sensing patterns 221a. FIG. 5B shows the one first trace line 210ta overlapping the sensing unit SUa. However, the sensing unit SUa may overlap two or more first trace lines or does not overlap a first trace line depending on a location of the sensing unit Sua, according to embodiments. The first trace line 210ta may be electrically connected to the 1-1st electrode 210-1 included in a sensing unit other than the sensing unit SUa shown in FIG. 5B.

According to an embodiment of the present disclosure, when viewed from above a plane, the first trace line 210ta does not overlap the sensing patterns 221a. The first trace line 210ta overlaps the sensing portion 211a and may intersect the bridge pattern 222a in an insulation scheme. Accordingly, the effect of signal interference or parasitic capacitance between the 2-1st electrode 220-1a and the first trace line 210ta may be minimized or reduced.

Figure 6:
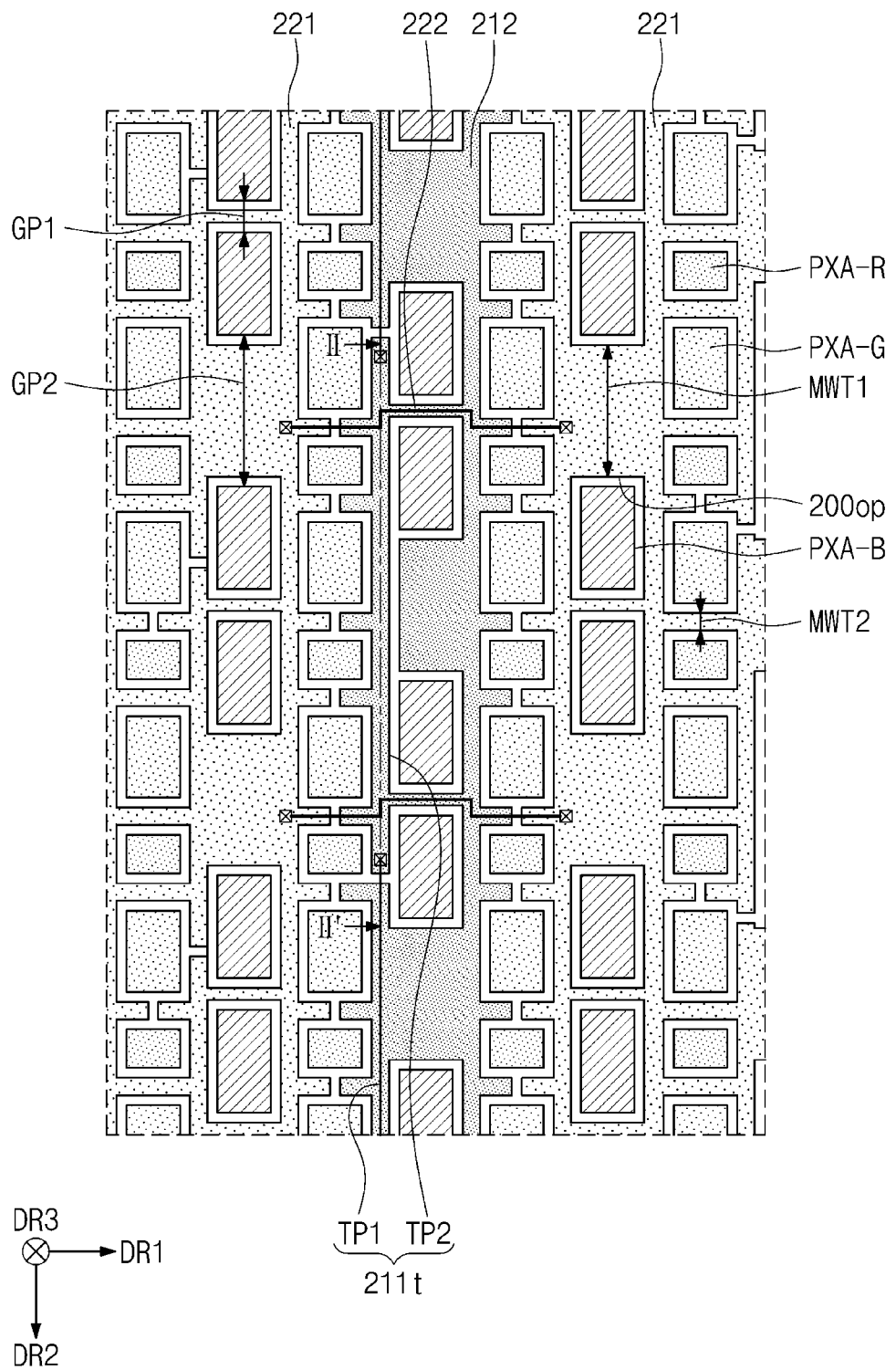
FIG. 6 is an enlarged plan view of one portion of an electronic device, according to an embodiment of the present disclosure.

FIG. 6 is an enlarged plan view of one portion of the electronic device 1000 (see FIG. 1), according to an embodiment of the present disclosure.

Referring to FIG. 6, the sensing portion 211, the bridge portion 212, and the sensing pattern 221 may have a mesh shape. In FIG. 6, one portion of the bridge portion 212 and one portion of the sensing pattern 221 may be shown representatively, and a plurality of openings 200op may be defined in the bridge portion 212 and the sensing pattern 221. The plurality of openings 220op may overlap the first light emitting area PXA-R, the second light emitting area PXA-G, and the third light emitting area PXA-B. According to an embodiment, the sensing portion 211, the bridge portion 212, the sensing pattern 221, and the bridge patterns 222 do not overlap the first light emitting area PXA-R, the second light emitting area PXA-G, and the third light emitting area PXA-B.

In an embodiment of the present disclosure, the plurality of first light emitting areas PXA-R may be provided, the plurality of second light emitting areas PXA-G may be provided, and the plurality of third light emitting areas PXA-B may be provided. The first light emitting area PXA-R and the second light emitting area PXA-G may be alternately and repeatedly arranged in the second direction DR2. The third light emitting areas PXA-B may be arranged in the second direction DR2. For example, the third light emitting areas PXA-B may be alternately spaced from one another with a first interval GP1 and a second interval GP2 greater than the first interval GP1.

In an embodiment of the present disclosure, a width MWT1 of each of mesh lines of the sensing portion 211, the bridge portion 212, and the sensing pattern 221 positioned between the third light emitting areas PXA-B spaced by the second interval GP2 may be greater than a width MWT2 of each of mesh lines positioned between the first light emitting area PXA-R and the second light emitting area PXA-G. The bridge patterns 222 may be arranged between the third light emitting areas PXA-B spaced by the first interval GP1, but embodiments are not particularly limited thereto.

Figure 7:
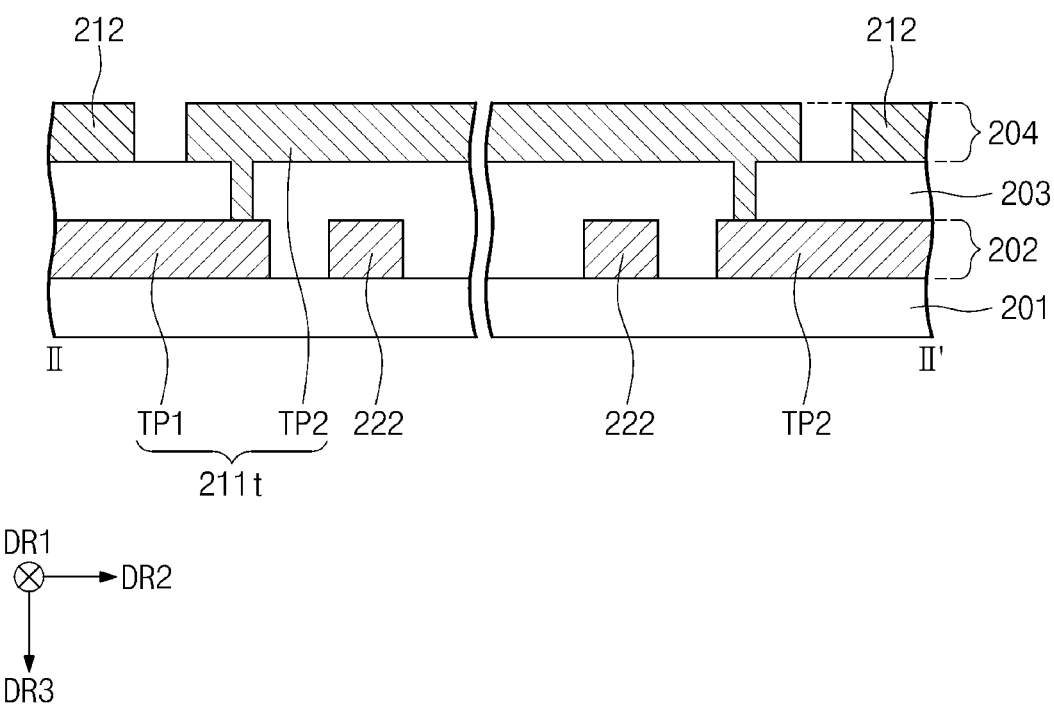
FIG. 7 is a cross-sectional view of a sensor layer, according to an embodiment of the present disclosure.

FIG. 7 is a cross-sectional view of the sensor layer 200, according to an embodiment of the present disclosure. For example, FIG. 7 may be a cross-sectional view taken along line II-II' of FIG. 6.

Referring to FIGS. 5A, 6, and 7, one portion of the 1-1st trace line 211t may overlap the bridge portion 212 of the 1-2nd electrode 210-2. Moreover, one portion of the 1-1st trace line 211t may intersect the bridge pattern 222 in an insulation scheme.

In an embodiment of the present disclosure, the 1-1st trace line 211t may include a first portion TP1 included in the first conductive layer 202 and a second portion TP2 included in the second conductive layer 204. The first portion TP1 may be disposed on the same layer as the bridge pattern 222, and the second portion TP2 may be disposed on a layer different from that of the bridge pattern 222. The second portion TP2 may intersect the bridge pattern 222 in an insulation scheme.

In an embodiment of the present disclosure, the second portion TP2 may be insulated from mesh lines constituting the bridge portion 212 and the sensing pattern 221, and may be spaced apart from the mesh lines.

Figure 8A:
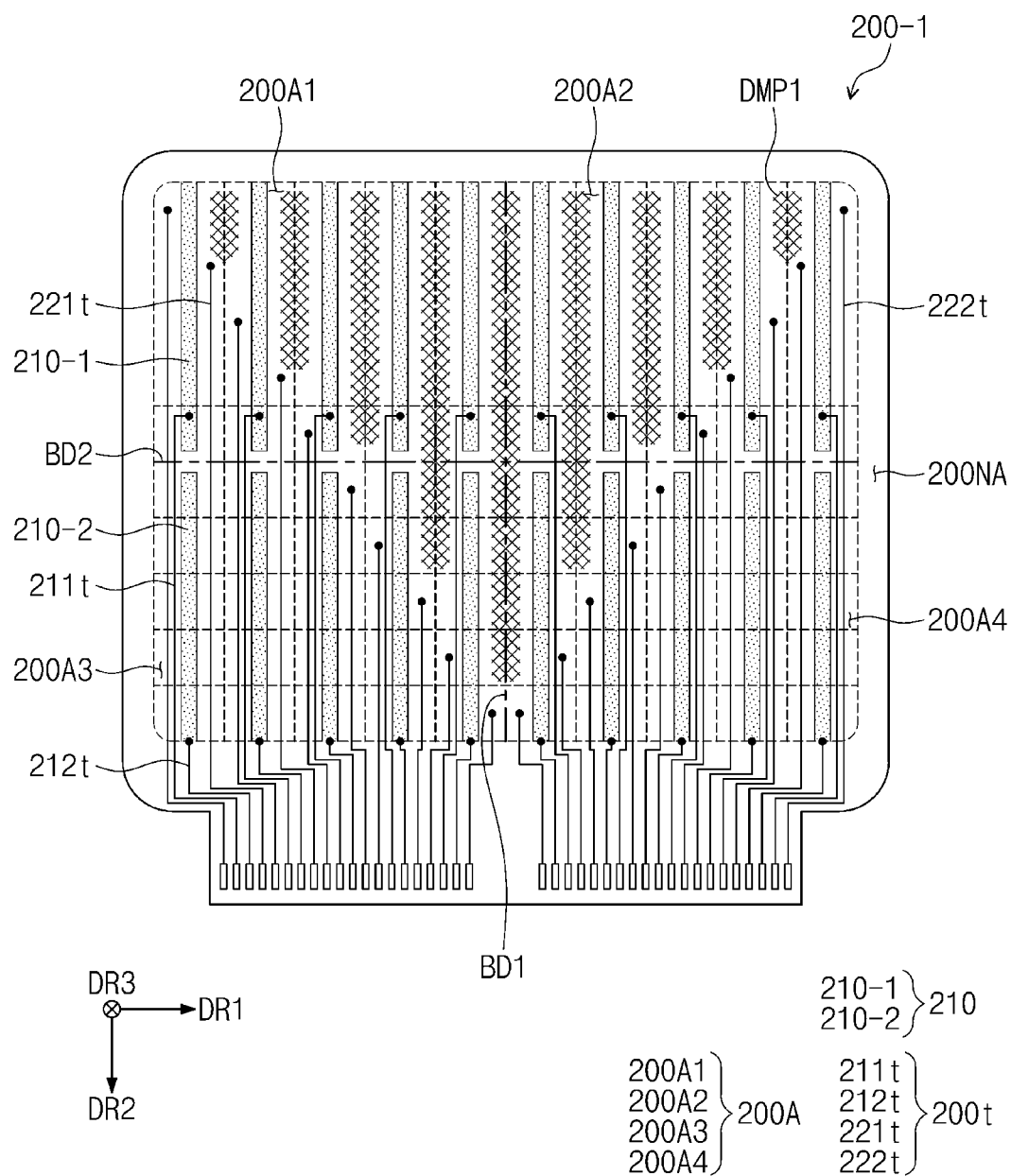
FIG. 8A is a plan view illustrating a partial configuration of a sensor layer, according to an embodiment of the present disclosure.
Figure 8B:
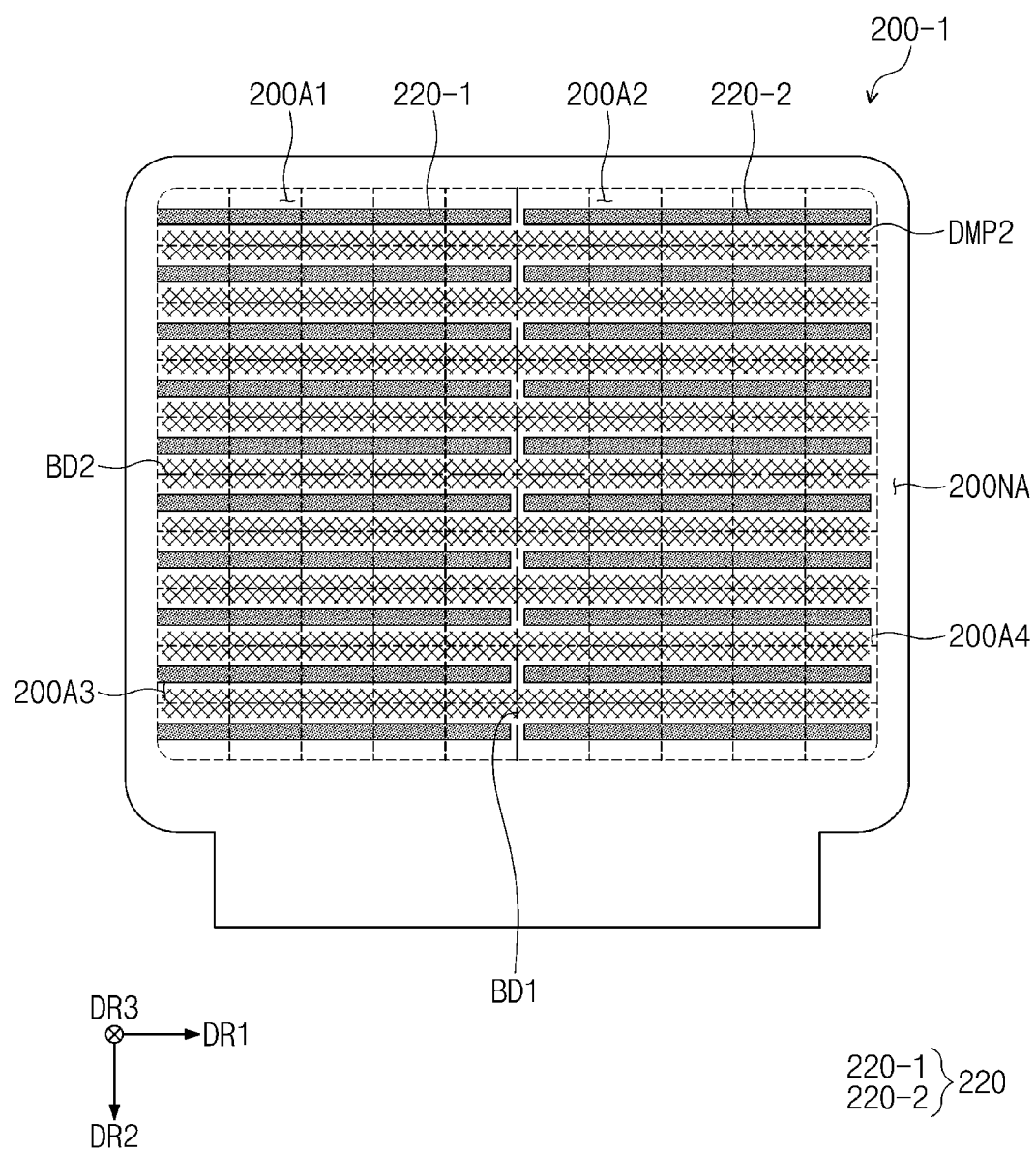
FIG. 8B is a plan view illustrating a partial configuration of a sensor layer, according to an embodiment of the present disclosure.

FIG. 8A is a plan view illustrating a partial configuration of a sensor layer 200-1, according to an embodiment of the present disclosure. FIG. 8B is a plan view illustrating a partial configuration of a sensor layer 200-1, according to an embodiment of the present disclosure.

Referring to FIGS. 3A, 8A, and 8B, the first conductive layer 202 of the sensor layer 200-1 is shown in FIG. 8A, and the second conductive layer 204 of the sensor layer 200-1 is shown in FIG. 8B. However, this is only an example, and the second conductive layer 204 of the sensor layer 200-1 may be shown in FIG. 8A and the first conductive layer 202 of the sensor layer 200-1 may be shown in FIG. 8B.

Referring to FIGS. 3A and 8A, the first conductive layer 202 may include the plurality of trace lines 200t and the plurality of first electrode groups 210. Both the plurality of trace lines 200t and the plurality of first electrode groups 210 may have a mesh structure.

The trace lines 200t may include the 1-1st trace line 211t electrically connected to the 1-1st electrode 210-1, the 1-2nd trace line 212t electrically connected to the 1-2nd electrode 210-2, the 2-1st trace line 221t, and the 2-2nd trace line 222t. The 1-1st trace line 211t and 1-2nd trace line 212t may be insulated from the first electrode groups 210 and may be spaced from the first electrode groups 210. The 1-1st trace line 211t, the 1-2nd trace line 212t, the 2-1st trace line 221t and the 2-2nd trace line 222t may be spaced from one another other without overlapping one another.

In an embodiment of the present disclosure, the first conductive layer 202 may further include first dummy patterns DMP1 positioned in a space where the trace lines 200t and the first electrode groups 210 are not positioned. All of the trace lines 200t, the first electrode groups 210 and the first dummy patterns DMP1 may have a mesh structure. The first dummy patterns DMP1 may be electrically floated or grounded. Alternatively, a constant voltage may be applied to each of the first dummy patterns DMP1. In an embodiment of the present disclosure, the first dummy patterns DMP1 may be omitted.

Referring to FIGS. 3A and 8B, the second conductive layer 204 may include the second electrode groups 220. The 2-1st electrodes 220-1 and the 2-2nd electrodes 220-2 included in the second electrode groups 220 may be spaced apart from each other without overlapping each other.

In an embodiment of the present disclosure, the second conductive layer 204 may further include second dummy patterns DMP2 positioned in a space where the second electrode groups 220 are not positioned. Both the second electrode groups 220 and the second dummy patterns DMP2 may have a mesh structure. The second dummy patterns DMP2 may be electrically floated or grounded. Alternatively, a constant voltage may be applied to each of the second dummy patterns DMP2. In an embodiment of the present disclosure, the second dummy patterns DMP2 may be omitted.

Figure 9A:
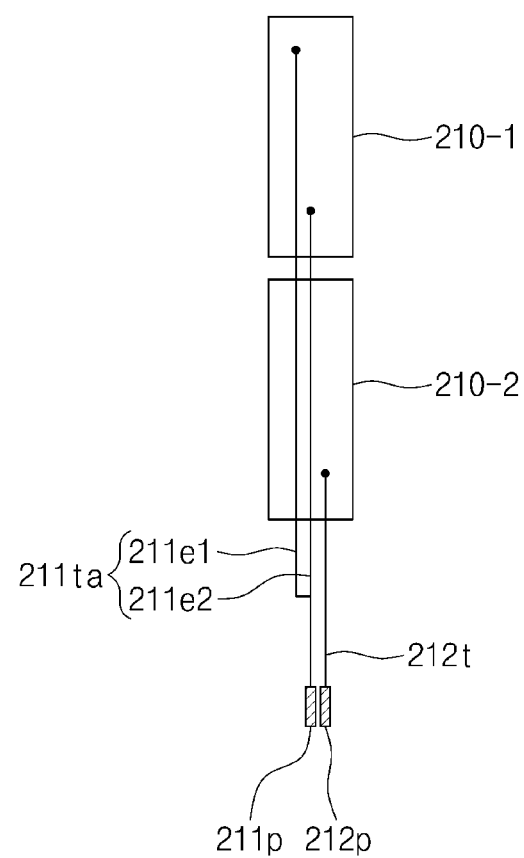
FIG. 9A is a plan view illustrating a partial configuration of a sensor layer, according to an embodiment of the present disclosure.

FIG. 9A is a plan view illustrating a partial configuration of a sensor layer, according to an embodiment of the present disclosure.

Referring to FIGS. 4B and 9A, the one 1-1st electrode 210-1, the one 1-2nd electrode 210-2, the 1-1st trace line 211ta, and the 1-2nd trace line 212t are shown. The 1-1st trace line 211ta may be electrically connected to the 1-1st electrode 210-1, and the 1-2nd trace line 212t may be electrically connected to the 1-2nd electrode 210-2.

A length of the 1-1st trace line 211ta may be longer than a length of the 1-2nd trace line 212t. In an embodiment of the present disclosure, the 1-1st trace line 211ta may include a first extension line 211e1, which overlaps the display area 100A (see FIG. 4A) and which is connected to the 1-1st electrode 210-1, and a second extension line 211e2, which overlaps the display area 100A (see FIG. 4A) and which is connected to the 1-1st electrode 210-1.

According to an embodiment of the present disclosure, the 1-1st trace line 211ta having a relatively long length may include the two or more extension lines 211e1 and 211e2. Accordingly, the resistance of the 1-1st trace line 211ta may be reduced, and signal delay may be reduced.

According to an embodiment of the present disclosure, the 1-1st trace line 211ta may be electrically connected to a first pad 211p, and the 1-2nd trace line 212t may be electrically connected to a second pad 212p. Accordingly, the 1-1st electrode 210-1 and the 1-2nd electrode 210-2 may be completely electrically separated from each other within the sensor layer 200. In an embodiment of the present disclosure, the first pad 211p and the second pad 212p may receive the same transmission signal (e.g., a TX signal). Accordingly, the 1-1st electrode 210-1 and the 1-2nd electrode 210-2 may operate as one channel. However, this is only an example and embodiments are not particularly limited thereto.

Figure 9B:
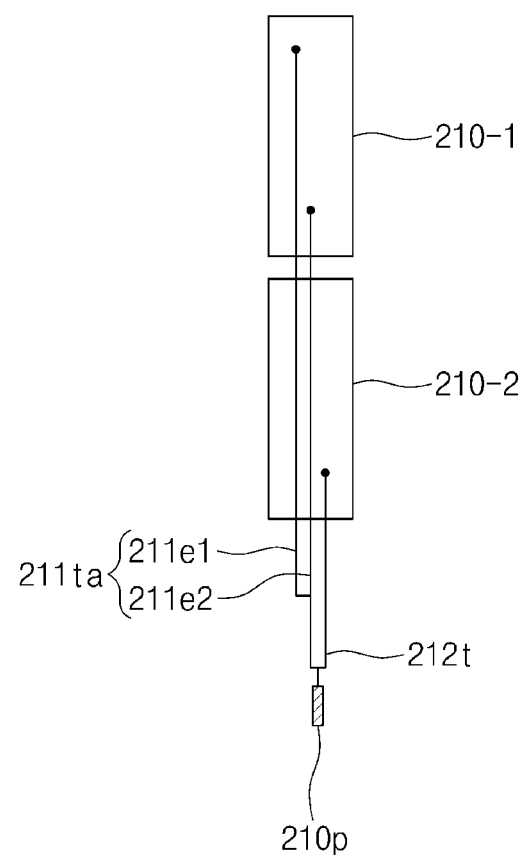
FIG. 9B is a plan view illustrating a partial configuration of a sensor layer, according to an embodiment of the present disclosure.

FIG. 9B is a plan view illustrating a partial configuration of a sensor layer, according to an embodiment of the present disclosure. In the description of FIG. 9B, differences from an embodiment of FIG. 9A are primarily described. For convenience of explanation, the same reference numerals are assigned to the same components, and a further description of components and technical aspects previously described will be omitted.

Referring to FIG. 9B, the 1-1st trace line 211ta and the 1-2nd trace line 212t may be electrically connected to one pad 210p. Accordingly, the 1-1st electrode 210-1 and the 1-2nd electrode 210-2 may receive the same signal through the pad 210p. Accordingly, the 1-1st electrode 210-1 and the 1-2nd electrode 210-2 may operate as one channel.

Figure 10:
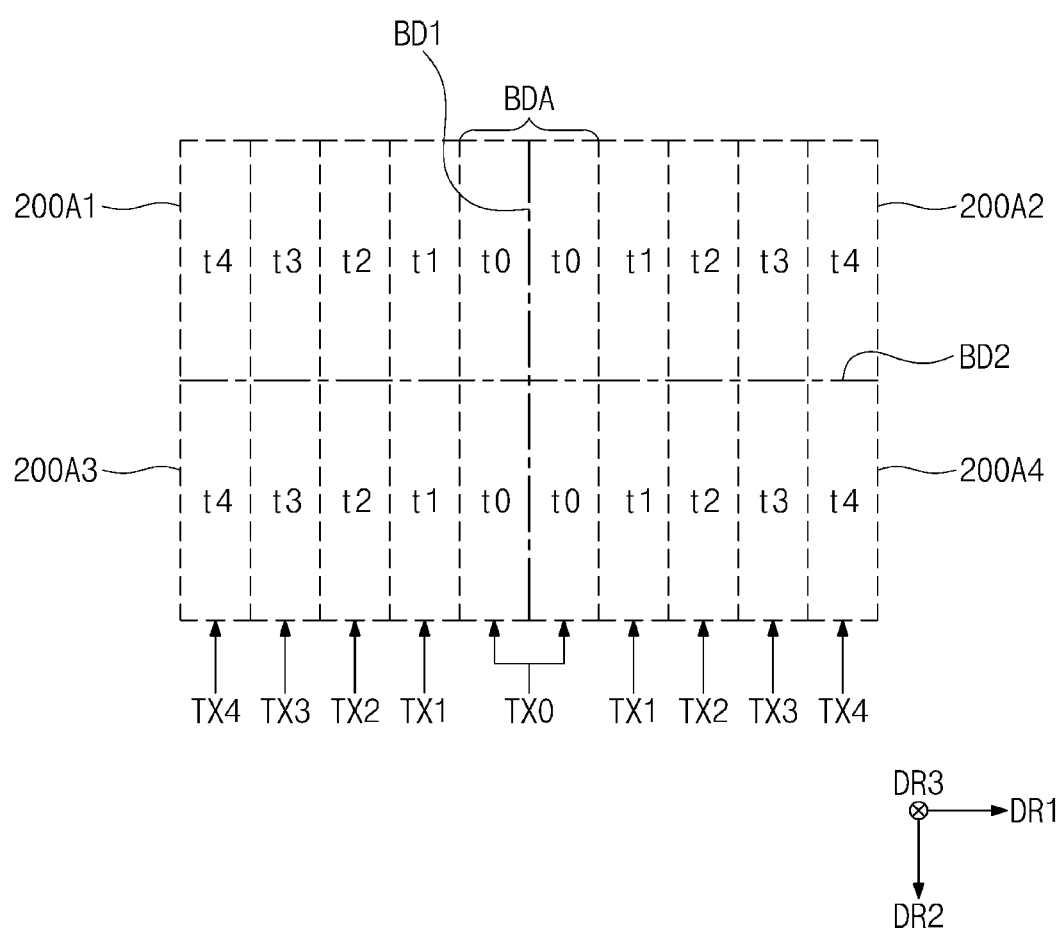
FIG. 10 is a diagram for describing an operation of a sensor layer, according to an embodiment of the present disclosure.

FIG. 10 is a diagram for describing an operation of a sensor layer, according to an embodiment of the present disclosure.

Referring to FIGS. 2, 4B, and 10, the sensor driver 200C may output a transmission signal to the first electrode groups 210, and may receive a sensing signal from the second electrode groups 220.

Each of the first electrode groups 210 may include the 1-1st electrode 210-1 and the 1-2nd electrode 210-2. The sensor driver 200C may simultaneously output the transmission signal to the 1-1st electrode 210-1 and the 1-2nd electrode 210-2. Accordingly, a plurality of first electrodes included in one first electrode group 210 may operate similarly to one channel.

The first boundary BD1 extending in the second direction DR2 may be defined on the sensor layer 200, and a boundary area BDA including the first boundary BD1 may be defined. The 2-1st electrode 220-1 and the 2-2nd electrode 220-2 may be spaced apart from each other with the first boundary BD1 disposed therebetween. One portion of the 2-1st electrode 220-1 and one portion of the 2-2nd electrode 220-2 may overlap each other in the boundary area BDA.

The sensor driver 200C may simultaneously output a transmission signal TX0 to first electrode groups, which are positioned in the boundary area BDA, from among the first electrode groups 210. Furthermore, the first boundary BD1 may be a division driving boundary line. Accordingly, the sensor driver 200C may sequentially output a plurality of transmission signals TX0, TX1, TX2, TX3, and TX4 to the first electrode groups 210 so as to be symmetric with respect to the first boundary BD1. For example, it may be understood that t0, t1, t2, t3, and t4 indicate a time sequence.

FIG. 10 illustrates that the transmission signals TX0, TX1, TX2, TX3, and TX4 are sequentially provided in a direction away from the first boundary BD1, but embodiments are not particularly limited thereto. For example, the sensor driver 200C may sequentially provide the transmission signals TX0, TX1, TX2, TX3, and TX4 in a direction toward the first boundary BD1.

FIG. 11 is a diagram for describing an operation of a sensor layer, according to an embodiment of the present disclosure.

Referring to FIG. 11, t0 is displayed in all areas. That is, the sensor driver 200C may simultaneously output transmission signals TXa1, TXa2, . . . , TXak to the first electrode groups 210. 'k' may be a positive integer of 3 or greater.

In an embodiment of the present disclosure, the transmission signals TXa1, TXa2, . . . , TXak may include the first transmission signal TXa1 and the second transmission signal TXa2. The first transmission signal TXa1 and the second transmission signal TXa2 may be different from each other. For example, at least one of the transmission signals TXa1, TXa2, . . . , TXak may be different from the other transmission signals thereof. The transmission signals TXa1, TXa2, . . . , TXak may be different from each other. The fact that signals are different from one another may correspond to, for example, a fact that phases of the signals are different from one another, a fact that waveforms of the signals are different from one another, frequencies of the signals are different from one another, or amplitudes of the signals are different from one another.

As in an embodiment of the present disclosure, when the transmission signals TXa1, TXa2, . . . , TXak are simultaneously provided to all the first electrode groups 210 included in the sensor layer 200, a response speed to the input device 2000 or the touch 3000 may be increased. For example, regardless of the direction the input device 2000 or the touch 3000 moves in, the sensor layer 200 may quickly recognize an external input without delay. For example, the accuracy of an input by the input device 2000 may be increased.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As described above, a sensor layer may include first electrode groups and second electrode groups. Each of the first electrode groups may include two or more first electrodes, and each of the second electrode groups may include two or more second electrodes. Accordingly, as the load of one first electrode or one second electrode decreases, the touch sensitivity of the sensor layer may be increased.

Also, according to embodiments of the present disclosure, the trace lines do not overlap each other, a trace line electrically connected to the first electrode group may minimally overlap the second electrode group, and/or a trace line electrically connected to the second electrode group does not overlap the first electrode group. Accordingly, the effect of signal interference or parasitic capacitance between an electrode group and trace lines may be minimized or reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. An electronic device, comprising:
a display layer on which a display area and a non-display area disposed adjacent to the display area are defined; and
a sensor layer disposed on the display layer,
wherein the sensor layer comprises:
a plurality of first electrode groups arranged in a first direction;
a plurality of second electrode groups arranged in a second direction crossing the first direction; and
a plurality of trace lines electrically connected to the plurality of first electrode groups and the plurality of second electrode groups and at least partially overlapping the display area,
wherein each of the plurality of first electrode groups includes a 1-1st electrode and a 1-2nd electrode spaced apart and electrically separated from each other in the second direction, and
wherein each of the plurality of second electrode groups includes a 2-1st electrode and a 2-2nd electrode spaced apart and electrically separated from each other in the first direction,
wherein a length of each of the 2-1st electrode and the 2-2nd electrode is smaller than a width of the display area in the first direction, and a length of each of the 1-1st electrode and the 1-2nd electrode is smaller than a width of the display area in the second direction, and wherein all the plurality of trace lines extend towards a line boundary extending along the first direction between the display area and the non-display area.

2. The electronic device of claim 1, wherein the plurality of trace lines comprise:
a 1-1st trace line electrically connected to the 1-1st electrode;
a 1-2nd trace line electrically connected to the 1-2nd electrode;
a 2-1st trace line electrically connected to the 2-1st electrode; and
a 2-2nd trace line electrically connected to the 2-2nd electrode, and
wherein the 1-1st trace line, the 2-1st trace line, and the 2-2nd trace line overlap the display area.

3. The electronic device of claim 2, wherein a length of the 1-1st trace line is longer than a length of the 1-2nd trace line, and
wherein the 1-1st trace line includes a first extension line overlapping the display area and connected to the 1-1st electrode, and a second extension line overlapping the display area and connected to the 1-1st electrode.

4. The electronic device of claim 2, wherein each of the 2-1st trace line and the 2-2nd trace line does not overlap the plurality of first electrode groups.

5. The electronic device of claim 2, wherein the 2-1st electrode includes a plurality of patterns spaced in the first direction, and a bridge pattern electrically connected to the plurality of patterns, and
wherein the 1-1st trace line intersects and is insulated from the bridge pattern.

6. The electronic device of claim 5, wherein the bridge pattern, the 2-1st trace line, and the 2-2nd trace line are included in a first conductive layer, and
wherein the plurality of first electrode groups and the plurality of patterns are included in a second conductive layer different from the first conductive layer.

7. The electronic device of claim 6, wherein the 1-1st trace line includes a first portion included in the first conductive layer, and a second portion included in the second conductive layer, and
wherein the second portion intersects and is insulated from the bridge pattern.

8. The electronic device of claim 2, wherein the plurality of trace lines and the plurality of first electrode groups are included in a first conductive layer, and
wherein the plurality of second electrode groups are included in a second conductive layer different from the first conductive layer.

9. The electronic device of claim 8, wherein the first conductive layer includes a plurality of first dummy patterns that are electrically insulated from the plurality of trace lines and the plurality of first electrode groups, and
wherein the second conductive layer further includes a plurality of second dummy patterns electrically insulated from the plurality of second electrode groups.

10. The electronic device of claim 1, further comprising:
a sensor driver configured to drive the sensor layer,
wherein a boundary is defined on the sensor layer in the second direction, and
wherein the sensor driver simultaneously outputs a transmission signal to first electrode groups, which are positioned in a boundary area including the boundary, from among the plurality of first electrode groups.

11. The electronic device of claim 10, wherein the boundary is a division driving boundary line, and
wherein the sensor driver sequentially outputs a plurality of transmission signals to the plurality of first electrode groups so as to be symmetric with respect to the boundary.

12. The electronic device of claim 1, further comprising:
a sensor driver configured to drive the sensor layer,
wherein a plurality of transmission signals are simultaneously provided to the plurality of first electrode groups, respectively, and
wherein a first transmission signal and a second transmission signal among the plurality of transmission signals are different from each other.

13. The electronic device of claim 1, further comprising:
a sensor driver configured to drive the sensor layer,
wherein the sensor driver simultaneously outputs a transmission signal to the 1-1st electrode and the 1-2nd electrode.

14. The electronic device of claim 1, wherein each of the plurality of trace lines includes a first mesh line,
wherein each of the plurality of first electrode groups or each of the plurality of second electrode groups includes a second mesh line, and
wherein a width of the second mesh line is greater than a width of the first mesh line.

15. An electronic device, comprising:
a sensor layer in which a first sensing area, a second sensing area, a third sensing area, and a fourth sensing area are defined,
wherein the sensor layer comprises:
a plurality of first electrode groups arranged in a first direction, each including a 1-1st electrode and a 1-2nd electrode spaced apart and electrically separated from each other in a second direction crossing the first direction;
a plurality of second electrode groups arranged in the second direction, each including a 2-1st electrode and a 2-2nd electrode spaced apart and electrically separated from each other in the first direction;
a 1-1st trace line connected to the 1-1st electrode via the third sensing area or the fourth sensing area;
a 1-2nd trace line connected to the 1-2nd electrode;
a 2-1st trace line overlapping at least one of the first to fourth sensing areas and connected to the 2-1st electrode; and
a 2-2nd trace line overlapping at least one of the first to fourth sensing areas and connected to the 2-2nd electrode,
wherein a length of each of the 2-1st electrode and the 2-2nd electrode is smaller than a width of the display area in the first direction, and a length of each of the 1-1st electrode and the 1-2nd electrode is smaller than a width of the display area in the second direction, and
wherein the 1-1st electrode is connected only to the 1-1st trace line, the 1-2nd electrode is connected only to the 1-2nd trace line, the 2-1st electrode is connected only to the 2-1st trace line, and the 2-2nd electrode is connected only to the 2-2nd trace line.

16. The electronic device of claim 15, wherein a length of the 1-1st trace line is longer than a length of the 1-2nd trace line, and
wherein the 1-1st trace line includes a first extension line connected to the 1-1st electrode, and a second extension line connected to the 1-1st electrode.

17. The electronic device of claim 15, further comprising:
a sensor driver configured to drive the sensor layer, wherein the sensor driver simultaneously outputs a transmission signal to the 1-1st electrode and the 1-2nd electrode.

18. An electronic device, comprising:
a display layer on which a display area and a non-display area disposed adjacent to the display area are defined;
a sensor layer disposed on the display layer and configured to sense an external input; and
a sensor driver configured to drive the sensor layer,
wherein the sensor layer comprises:
a plurality of first electrode groups arranged in a first direction;
a plurality of second electrode groups arranged in a second direction crossing the first direction; and
a plurality of trace lines electrically connected to the plurality of first electrode groups and the plurality of second electrode groups and at least partially overlapping the display area,
wherein each of the plurality of first electrode groups includes a 1-1st electrode and a 1-2nd electrode spaced apart and electrically separated from each other in the second direction,
wherein the sensor driver simultaneously outputs a transmission signal to the 1-1st electrode and the 1-2nd electrode, and
a length of each of the 1-1st electrode and the 1-2nd electrode is smaller than a width of the display area in the second direction.

19. The electronic device of claim 18, wherein each of the plurality of second electrode groups includes a 2-1st electrode and a 2-2nd electrode spaced apart from each other in the first direction,
wherein the plurality of trace lines comprise:
a 1-1st trace line electrically connected to the 1-1st electrode;
a 1-2nd trace line electrically connected to the 1-2nd electrode;
a 2-1st trace line electrically connected to the 2-1st electrode; and
a 2-2nd trace line electrically connected to the 2-2nd electrode,
wherein the 1-1st trace line, the 2-1st trace line, and the 2-2nd trace line overlap the display area.

20. The electronic device of claim 19, wherein a length of the 1-1st trace line is longer than a length of the 1-2nd trace line, and
wherein the 1-1st trace line includes a first extension line overlapping the display area and connected to the 1-1st electrode, and a second extension line overlapping the display area and connected to the 1-1st electrode.

* * * * *